(12) United States Patent
Aoyama et al.

(10) Patent No.: US 8,336,716 B2
(45) Date of Patent: Dec. 25, 2012

(54) SHAFT-LIKE PARTS FEEDING APPARATUS

(75) Inventors: Yoshitaka Aoyama, Osaka (JP); Shoji Aoyama, Osaka (JP)

(73) Assignee: Yoshitaka Aoyama, Osaka (JP)

( * ) Notice: Subject to any disclaimer, the term of this patent is extended or adjusted under 35 U.S.C. 154(b) by 9 days.

(21) Appl. No.: 13/032,908

(22) Filed: Feb. 23, 2011

(65) Prior Publication Data

US 2011/0186483 A1 Aug. 4, 2011

Related U.S. Application Data

(62) Division of application No. 11/886,310, filed as application No. PCT/JP2006/311514 on Jun. 8, 2006, now abandoned.

(30) Foreign Application Priority Data

| Oct. 24, 2005 | (JP) | ................................ | 2005-337737 |
| Dec. 19, 2005 | (JP) | ................................ | 2005-381123 |
| Dec. 19, 2005 | (JP) | ................................ | 2005-381124 |
| Dec. 19, 2005 | (JP) | ................................ | 2005-381125 |

(51) Int. Cl.
*B07B 13/04* (2006.01)
(52) U.S. Cl. ........................................ 209/660; 209/911
(58) Field of Classification Search .................. 209/552, 209/567, 586, 658, 660, 674, 675, 911
See application file for complete search history.

(56) References Cited

U.S. PATENT DOCUMENTS

| 2,615,567 | A | | 10/1952 | Campbell |
| 3,729,095 | A | * | 4/1973 | Carr et al. .................... 209/542 |
| 3,743,091 | A | * | 7/1973 | Fowlkes .................... 209/652 |
| 3,954,181 | A | | 5/1976 | Fries |
| 5,074,742 | A | | 12/1991 | Aoyama |
| 5,359,171 | A | | 10/1994 | Aoyama |
| 6,653,590 | B1 | | 11/2003 | Aoyama et al. |
| 6,706,991 | B2 | | 3/2004 | Aoyama et al. |

(Continued)

FOREIGN PATENT DOCUMENTS

JP 60-122717 8/1985

(Continued)

OTHER PUBLICATIONS

International Search Report for PCT/JP2006/311514 mailed on Aug. 29, 2006.

(Continued)

*Primary Examiner* — Joseph C Rodriguez
(74) *Attorney, Agent, or Firm* — Wenderoth, Lind & Ponack, L.L.P.

(57) ABSTRACT

A parts feeding apparatus feeds projection bolts into a receiving hole in an electrode and includes an excessively long parts detecting device which detects projection bolts having excessively long shanks. The excessively long parts detecting device has a pass control member fixed between a pair of plates of the delivery section for engaging an excessively long shank and a control plate which prevents the projection bolt having the excessively long shank from projecting upward so as to lock the projection bolt in cooperation with the pass control member. A feed rod advances to a predetermined position at which the shanks of the projection bolts are inserted into the receiving hole, and a spacing between the holding head and a receiving hole when the feed rod is in the predetermined position is set to prevent projection bolts having an excessively short shank from reaching the receiving hole.

8 Claims, 7 Drawing Sheets

U.S. PATENT DOCUMENTS 7,669,707 B2 * 3/2010 Kenneway .................. 198/398

FOREIGN PATENT DOCUMENTS

| | | |
|---|---|---|
| JP | 62-5874 | 1/1987 |
| JP | 03-151172 | 6/1991 |
| JP | 6-21782 | 3/1994 |
| JP | 6-315774 | 11/1994 |
| JP | 8-1353 | 1/1996 |
| JP | 2509103 | 4/1996 |
| JP | 2599104 | 1/1997 |
| JP | 09-220676 | 8/1997 |
| JP | 11-347747 | 12/1999 |
| JP | 2000-317644 | 11/2000 |
| JP | 3309245 | 5/2002 |
| JP | 2003-136254 | 5/2003 |

OTHER PUBLICATIONS

Japanese Office Action drafted Nov. 27, 2009 in corresponding Japanese Patent Application No. 2005-337737 w/translation.

Japanese Office Action drafted Nov. 27, 2009 in corresponding Japanese Patent Application No. 2005-381123 w/translation.

Japanese Office Action drafted Nov. 27, 2009 in corresponding Japanese Patent Application No. 2005-381124 w/translation.

Japanese Office Action drafted Nov. 27, 2009 in corresponding Japanese Patent Application No. 2005-381125 w/translation.

* cited by examiner

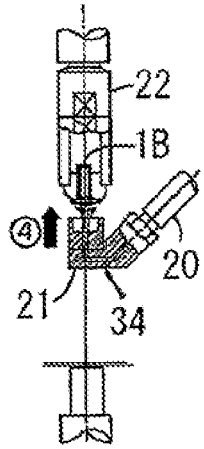
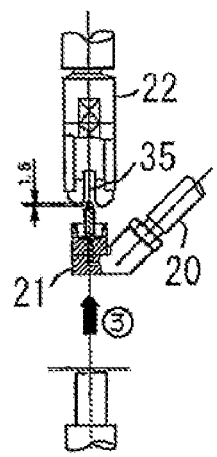
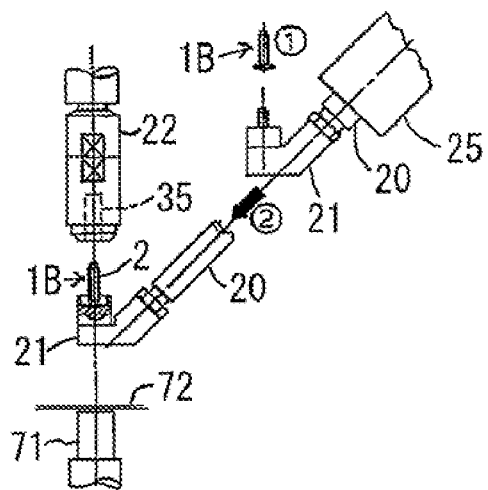
Fig. 6D  Fig. 6C  Fig. 6B  Fig. 6A
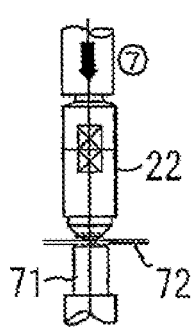
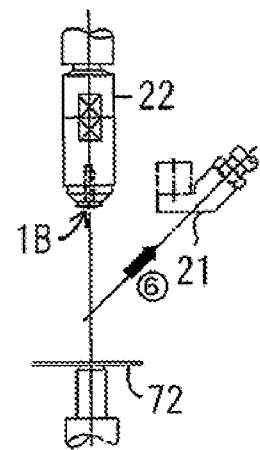
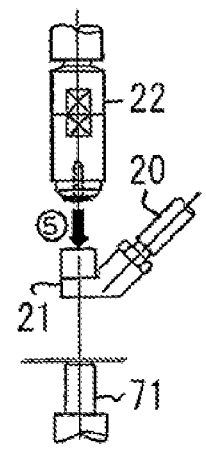
Fig. 6G  Fig. 6F  Fig. 6E
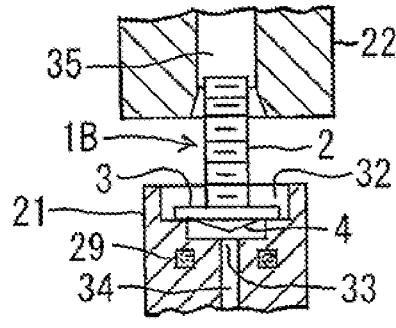
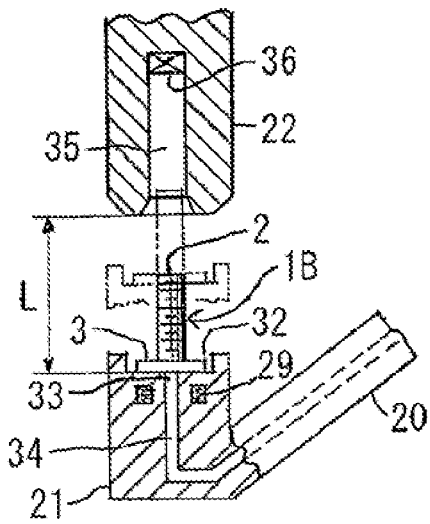
Fig. 6I  Fig. 6H Fig. 7D   Fig. 7C   Fig. 7B   Fig. 7A
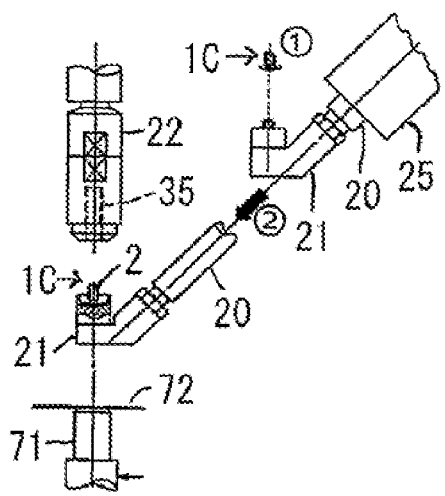
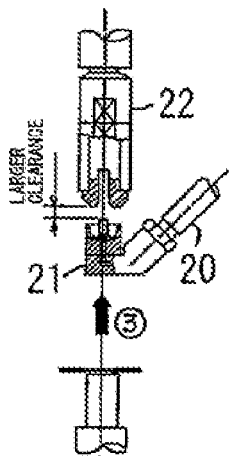
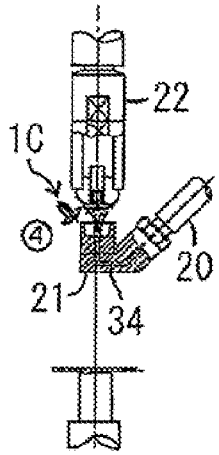
Fig. 7G   Fig. 7F   Fig. 7E
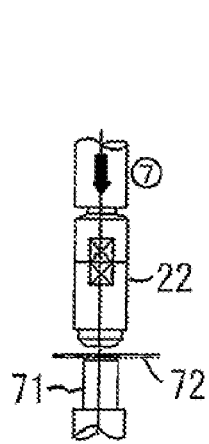
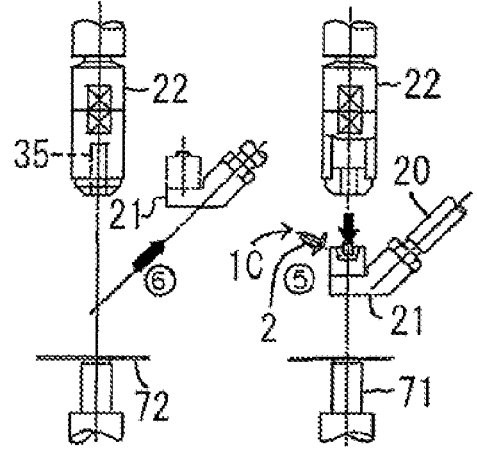
Fig. 7I
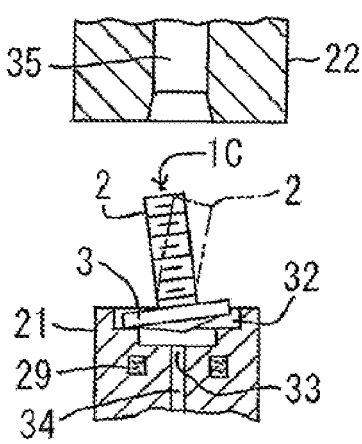
Fig. 7H
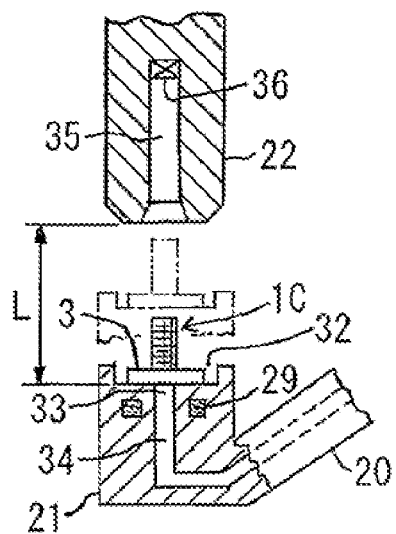

Fig. 8A
Fig. 8B
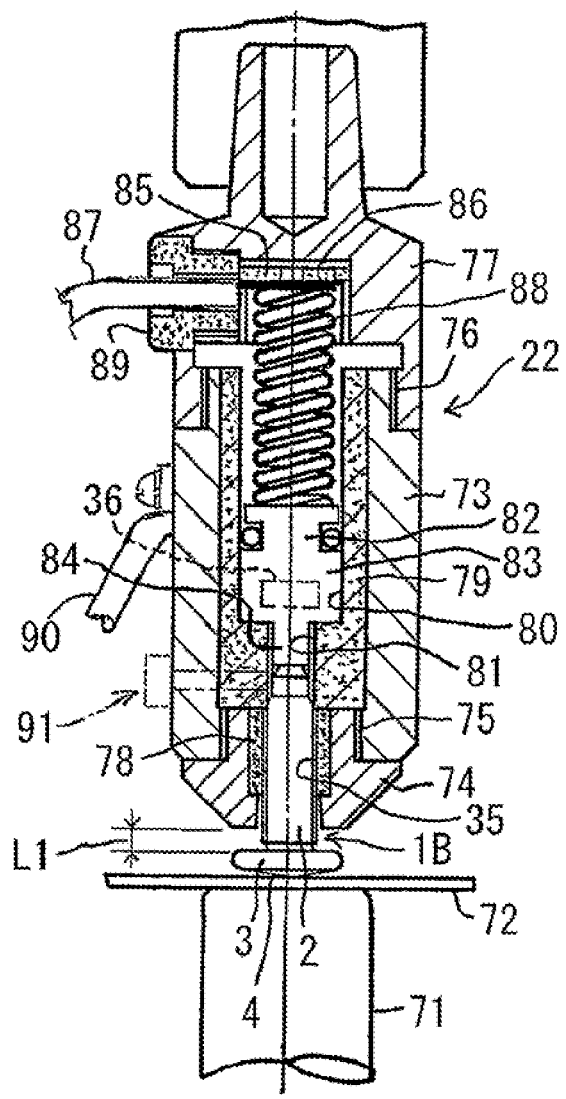
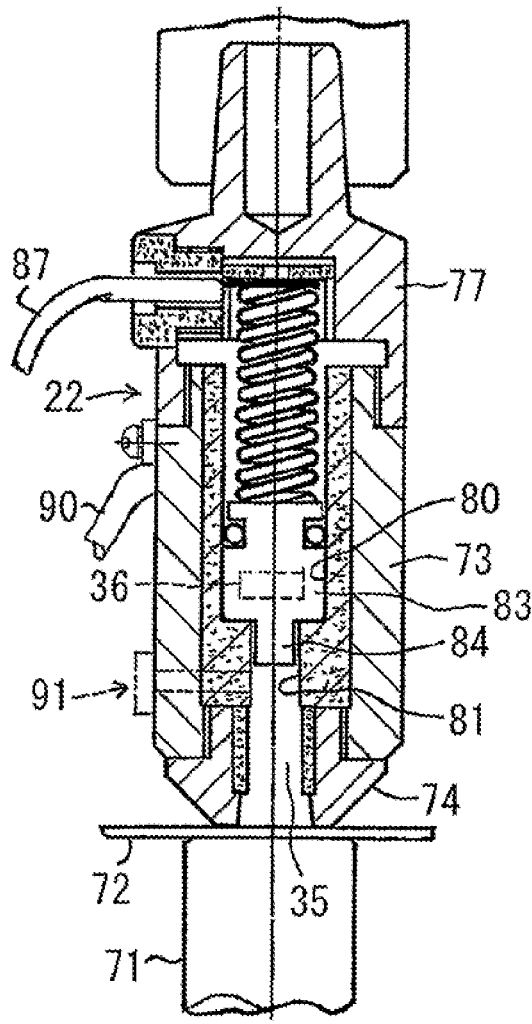

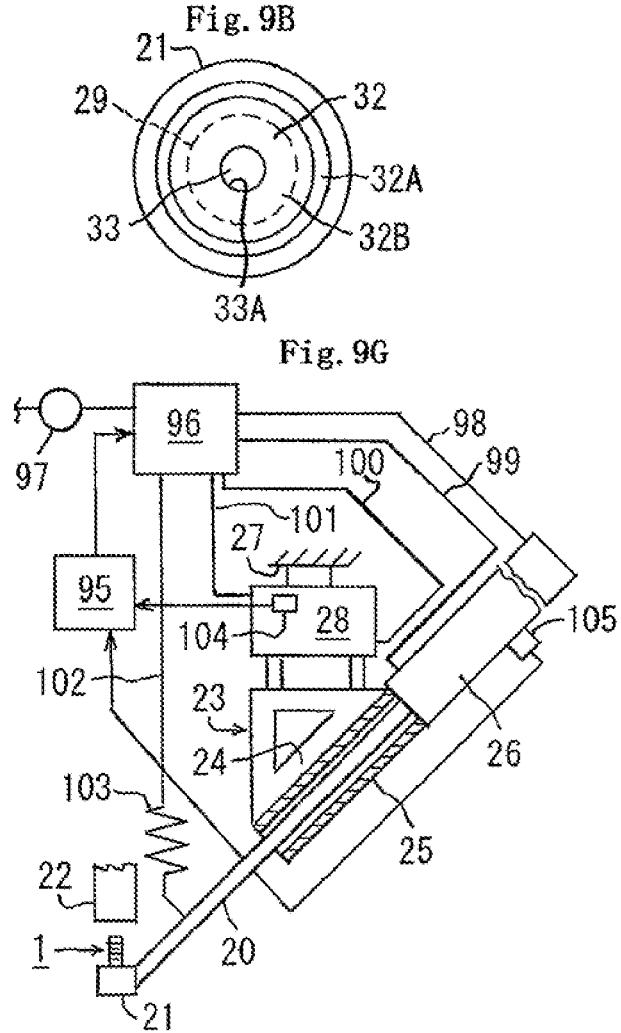
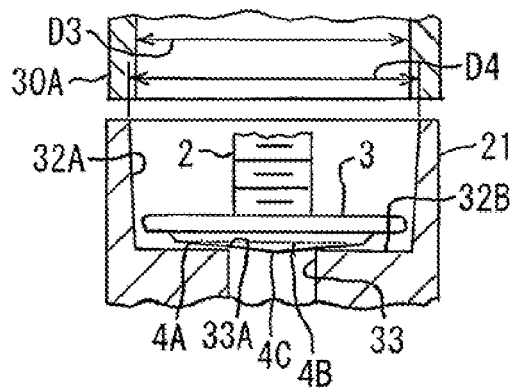
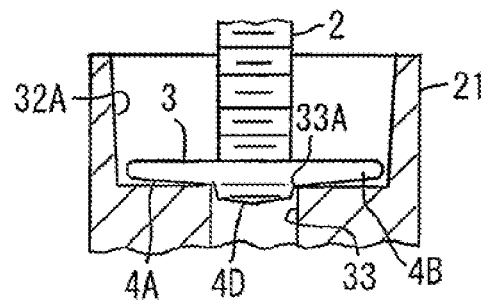
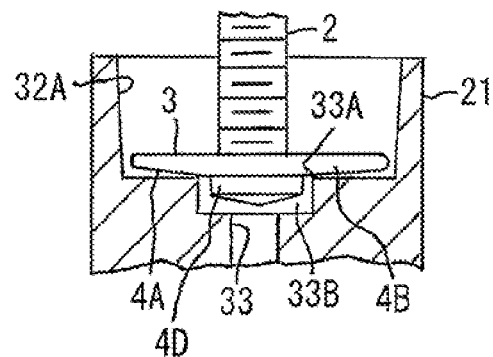
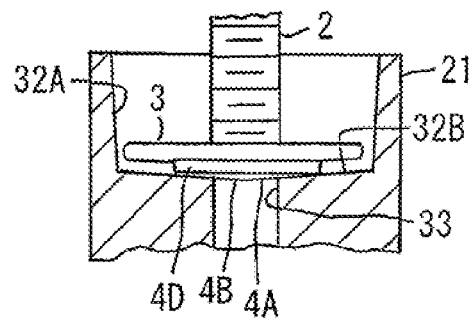

SHAFT-LIKE PARTS FEEDING APPARATUS

This application is a Divisional of U.S. application Ser. No. 11/886,310, filed May 30, 2008 now abandoned which is a National Stage Application of International Application No. PCT/JP2006/311514, filed Jun. 8, 2006.

BACKGROUND OF THE INVENTION

Field of the Invention

The present invention relates to a shaft-like parts feeding apparatus adapted to expel shaft-like parts of abnormal length so as to allow normal parts alone to reach a receiving hole in a welding electrode. Further, the invention also relates to a shaft-like parts feeding apparatus wherein a shaft-like part is inserted into the receiving hole by a feed rod having a holding head.

While the invention handles shaft-like parts as subject parts, a feed apparatus handling apertured parts as subject parts is disclosed in Japanese Patent No. 3309245. The technique disclosed therein is used to remove projection nuts of excessive outer size by a go and no-go gauge disposed in a parts feeder, and then ejecting nuts whose threaded hole inner diameter is smaller than that of normal nuts by a feed rod. This ejection is effected by abutting a thick feed rod against the undersized threaded hole while utilizing the fact that the feed rod cannot pass through the threaded hole.

Further, as a technique for inserting a projection bolt, held by the holding head of the feed rod into receiving hole in the electrode, there is Japanese Patent No. 2509103. According to the technique disclosed therein, the front end of a feed rod adapted for oblique advance and retraction is provided with a holding head for bolts, so that when the feed rod advances until the bolt is coaxial with the receiving hole, the feed rod is lifted to insert the bolt in the receiving hole.

Since the technique disclosed in above-mentioned Japanese Patent 3309245 is used to handle parts shaped like projection nuts, oversized nuts can be sorted out by a go and no-go gauge. In the case of handling long-sized parts such as shaft-like parts as subject parts, however, a go and no-go gauge having long-sizeness must be prepared. However, the operation of disposing such a long-sized go and no-go gauge at a predetermined place is very difficult for the reason of space. Further, in order to allow long-sized shaft-like parts to pass through such a go and no-go gauge correctly, it is necessary to correctly maintain the transfer attitude of the shaft-like parts; therefore, in this respect too, it is difficult to put the technique to practical use. On the other hand, ejection of an abnormal nut by abutting it against the undersized threaded removal hole can be easily realized, whereas ejection of shaft-like parts of abnormal length is difficult.

Further, the technique disclosed in the above-mentioned Japanese Patent No. 2509103 is used to insert a bolt, held by the holding head of the feed rod, in the receiving hole in the electrode; however, it is impossible to expel shaft-like parts of abnormal length in such an operating place.

Further, the technique disclosed in the above-mentioned Japanese Patent No. 2599104 is used to insert a bolt, held by the holding head of the feed rod, into the receiving hole in the electrode; however, it sometimes occurs that the bolt fails to be inserted into the receiving hole, and instead it returns to its original position as it is held by the holding head. If such returning operation takes place, the bolt held by the holding head will interfere with a bolt standing by to cause the two bolts to be intertwined to damage peripheral structures.

Further, the structure of the holding head must be made such that the holding of bolts and delivery of bolts by compressed air are reliably effected.

The invention has been accomplished with the above problems in mind.

SUMMARY OF THE INVENTION

The invention provides a shaft-like parts feeding apparatus wherein removal of excessively long, abnormal length shaft-like parts in a feed path extending from a parts feeder to a point short of a feed rod, and subsequent removal of excessively short, abnormal length shaft-like parts immediately in front of an electrode, i.e., between the holding head of a feed rod and the electrode are combined by a system having a cooperative feature and a system feature; ultimately, shaft-like parts of normal length alone are inserted into the receiving hole.

According to an embodiment of the invention, a shaft-like parts feeding apparatus includes a parts feeder for delivering shaft-like parts, and a feed path extending from the parts feeder to a point short of a feed rod, the feed rod performing a feed operation to insert a shaft-like part held by a holding head into a receiving hole in an electrode, the shaft-like parts feeding apparatus being characterized in that an excessively long parts detecting means which detects and removes excessively long parts longer than normal length is disposed in the parts feeder or in the feed path, and in that the spacing between the receiving hole and the holding head with the feed rod having stopped at a predetermined position after advancing, is set to an excessively short parts expelling spacing which prevents excessively short parts shorter than normal length from reaching the receiving hole.

There are cases where excessively long parts longer than normal length and excessively short parts shorter than normal length are mixed with shaft-like parts of normal length. Since the parts feeder or the feed path has disposed therein the excessively long parts detecting means for detecting and removing excessively long parts longer than normal length, excessively long parts are removed in this excessively long parts detecting means. Therefore, at the time when a shaft-like part reaches the holding head of the feed rod, excessively long parts have already been removed.

Next, a shaft-like part held by the holding head is a part of normal length or an excessively short part. In the case where a shaft-like part of normal length has been held by the holding head, the travel of the holding head allows the front end of the shaft-like part to be inserted into the receiving hole in the electrode, so that this shaft-like part is correctly held in the receiving hole. However, in the case where an excessively short part has been held by the holding head, the excessively short parts expelling spacing prevents the excessively short part from reaching the receiving hole, so that insertion into the receiving hole becomes impossible. If it is arranged that it fall off the holding head, the expelling can be effected immediately in front of the receiving hole.

As described above, excessively long parts are expelled in advance in the parts feeder or in the feed path, and an excessively short part held by the holding head can be expelled immediately in front of the receiving hole in the electrode. That is, since the region where excessively long parts are expelled is located on the upstream side which is flexible in terms of space, and since the region where excessively short parts are expelled is located on the downstream side, abnormal parts are systematically removed in a travel path for shaft-like parts.

Therefore, a treatment is performed such that after an excessively long part has been expelled in advance, the excessively short part alone cannot reach the receiving hole, with a normal or excessively short part held by the holding head. In other words, parts are removed by a method such that excessively long parts are expelled in a region where the expelling is facilitated and excessively short parts are prevented them from reaching the receiving hole. Therefore, excessively long and short parts are removed at places suitable for their respective removals, so that normal parts alone can be reliably fed to the electrode, while the welding of abnormal parts can be reliably prevented, thereby realizing a highly reliable parts treatment for the subsequent steps.

The excessively long parts detecting means is desirably constituted by a pass control member which locks the excessively long portion of a shaft-like part and which is disposed in the travel path of the parts feeder.

Since the pass control member locks the excessively long portion of a shaft-like part, excessively long shaft-like parts are reliably detected. Since the pass control member disposed in the travel path of the parts feeder receives the excessively long portion of an excessively long part coming traveling, the excessively long part changes its attitude. Therefore, being an abnormal part can be reliably detected on the basis of such change. Usually, it is arranged that shaft-like parts, which are long-sized, be transferred in a vertically suspended state. Consequently, abnormal parts can be detected simply by disposing at a predetermined height the pass control member adapted to catch an excessively long portion.

The excessively long parts detecting means is desirably constituted by a sensor means adapted to be operated by the excessively long portion of a shaft-like part and disposed in the feed path.

Since the sensor means detects the excessively long portion of a shaft-like part to emit an operating signal, the excessively long shaft-like part can be reliably detected. Since the sensor means disposed in the feed path is operated by the excessively long portions of traveling excessively long parts, being an abnormal part can be reliably detected on the basis of the signal obtained thereby. Usually, it is arranged that shaft-like parts, which are long-sized, be transferred in a vertically suspended state. Consequently, abnormal parts can be detected simply by disposing at a predetermined height the sensor means adapted to be operated by excessively long portions. Further, with such sensor means disposed in the travel path of the parts feeder, it is possible to effect detection of excessively long parts inside the parts feeder.

Advance of the feed rod desirably stops at a position where the axis of a shaft-like part held by the holding head coincides with the axis of the receiving hole, and a shaft-like part of normal length is inserted from this position into the receiving hole.

As described above, after coincidence between the axes of shaft-like part and receiving hole, the shaft-like part is inserted into the receiving hole in the presence of the excessively short parts expelling spacing. Therefore, normal parts are fed to the receiving hole in the usual correct operation, and predetermined welding is performed.

The electrode having the receiving hole desirably includes a detecting means for detecting a shaft-like part being inserted into the receiving hole.

A shaft-like part being inserted into the receiving hole can be confirmed by the detecting means. In the case where the advance operation of the electrode is effected by a signal emitted in response to this confirmation, the electrode operation is effected after confirmation of the presence of a shaft-like part, so that the so-called unloaded hammering with a shaft-like part absent can be prevented.

The detecting means is desirably arranged such that an electrifying path is completed by interposition of a shaft-like part in the electrifying path.

Since the electrifying path is completed by the presence of a shaft-like part in this manner, when a shaft-like part is in the receiving hole, the advance operation of the electrode can be reliably started, preventing the electrode from operating in the absence of a shaft-like part. Further, when a shaft-like part held in the electrode is pressed against a mating part such as a steel sheet part, the electrifying path can be completed by further travel of the shaft-like part. That is, something like a switch operation is effected between a portion of the shaft-like part and a portion of the electrode. In such case, when a shaft-like part is not present in the receiving hole, abnormal electrification can be avoided by preventing passage of welding current.

The detecting means is desirably a sensor for detecting the presence of a shaft-like part inserted into the receiving hole.

Since the sensor which directly detects the presence of a shaft-like part is employed, the presence or absence of a shaft-like part can be reliably detected. Further, an arrangement can be made such that depending on the sensor attaching position, the detection of shaft-like parts of normal length is effected, but the detection of excessively short parts is not effected. With the arrangement thus made, even if an excessively short part is inserted into the receiving hole for one reason or another, no signal is issued from the sensor, so that abnormal advance of the electrode can be prevented.

The shaft-like part is a projection bolt comprising a shank formed with a male thread, a flange integral with the shank, and a welding projection formed on the flange.

For example, in a car body assembling step for automobiles, many kinds of projection bolts are welded to a steel sheet part; therefore, an operator may pick up projection bolts lying on the floor and erroneously put them back to the parts feeder, resulting in a mixture of excessively long and excessively short bolts. However, the arrangements and functions as described above repel bolts of abnormal length, thereby preventing welding of erroneous bolts, eliminating problems which otherwise affect the subsequent steps. That is, this is useful in a parts feeding environment with excessively short parts along mixing in normal bolts.

The shaft-like parts feeding apparatus described at first is arranged such that removal of excessively long, abnormal length shaft-like parts in a feed path extending from a parts feeder to a point short of a feed rod, and subsequent removal of excessively short, abnormal length shaft-like parts immediately in front of the electrode, i.e., between the holding head of the feed rod and the electrode are combined by a system having a cooperative feature and a system feature. However, of the requirements constituting the feed apparatus having a system feature, "removal of excessively long, abnormal length shaft-like parts in a feed path extending from a parts feeder to a point short of a feed rod" is itself worthy of being put to practical use in an independent manner and has an independent feature as an invention. Particularly, in a parts feeding environment with excessively long, abnormal length shaft-like parts alone present, this structural requirement is useful.

From the standpoint, according to another embodiment of the invention, a shaft-like parts feeding apparatus includes a parts feeder for delivering shaft-like parts, and a feed path extending from the parts feeder to a point short of a feed rod, the feed rod performing a feed operation to insert a shaft-like part, held by a holding head, into a receiving hole in an electrode, the shaft-like parts feeding apparatus being characterized in that an excessively long parts detecting means which detects and removes excessively long parts longer than normal length is disposed in the parts feeder or in the feed path.

There are cases where excessively long parts longer than shaft-like parts of normal length are mixed with shaft-like parts of normal length. Since the parts feeder or the feed path has disposed therein the excessively long parts detecting means for detecting and removing excessively long parts longer than normal length, excessively long parts are removed in this excessively long parts detecting means. Therefore, at the time when a shaft-like part reaches the holding head of the feed rod, excessively long parts have already been removed.

The excessively long parts detecting means is desirably constituted by a pass control member which locks the excessively long portion of a shaft-like part and which is disposed in the travel path of the parts feeder.

Since the pass control member locks the excessively long portion of a shaft-like part, excessively long shaft-like parts are reliably detected. Since the pass control member disposed in the travel path of the parts feeder receives the excessively long portion of an excessively long part coming traveling, the excessively long part changes its attitude. Therefore, being an abnormal part can be reliably detected on the basis of such change. Usually, it is arranged that shaft-like parts, which are long-sized, be transferred in a vertically suspended state. Consequently, abnormal parts can be detected simply by disposing at a predetermined height the pass control member adapted to catch an excessively long portion.

The excessively long parts detecting means is desirably constituted by a sensor means adapted to be operated by the excessively long portions of shaft-like parts and disposed in the feed path.

Since the sensor means detects the excessively long portions of shaft-like parts to emit an operating signal, excessively long shaft-like parts can be reliably detected. Since the sensor means disposed in the feed path is operated by the excessively long portions of excessively long parts coming traveling, being an abnormal part can be reliably detected on the basis of the signal obtained. Usually, it is arranged that shaft-like parts, which are long-sized, be transferred in a vertically suspended state. Consequently, abnormal parts can be detected simply by disposing at a predetermined height the sensor means adapted to be operated by excessively long portions. Further, with such sensor means disposed in the travel path of the parts feeder, it is possible to effect detection of excessively long parts inside the parts feeder.

The shaft-like part in the excessively long parts detecting means desirably assumes a substantially vertical attitude.

With the shaft-like part thus assuming a substantially vertical attitude, the shaft-like part can be transferred in a vertically suspended state. Such transfer attitude allows the excessively long portion to be positioned in the lower end portion of the excessively long part; disposing, e.g., a pass control member in the lower end portion makes it possible to effect detection of the excessively long portion. That is, since the shaft-like part has assumed a vertical attitude, detection of the excessively long portion can be easily effected by causing some member to interfere with the lower end portion or by operating the sensor.

The shaft-like part is a projection bolt comprising a shank formed with a male thread, a flange integral with the shank, and a welding projection formed on the flange.

For example, in a car body assembling step for automobiles, many kinds of projection bolts are welded to a steel sheet part; therefore, an operator may pick up projection bolts lying on the floor and erroneously put them back to the parts feeder, resulting in excessively long bolts mixed in. However, the arrangements and functions as described above repel bolts of abnormal length, thereby preventing welding of erroneous bolts, eliminating problems which otherwise affect the subsequent steps. That is, this is useful in a parts feeding environment with excessively long bolts alone mixing in normal bolts.

The shaft-like parts feeding apparatus described at first is arranged such that removal of excessively long, abnormal length shaft-like parts in a feed path extending from a parts feeder to a point short of a feed rod, and subsequent removal of excessively short, abnormal length shaft-like parts immediately in front of the electrode, i.e., between the holding head of the feed rod and the electrode are combined by a system having a cooperative feature and a system feature. However, of the requirements constituting the shaft-like parts feeding apparatus having a system feature, "removal of excessively short, abnormal length shaft-like parts immediately in front of the electrode, i.e., between the holding head of the feed rod and the electrode" is itself worthy of being put to practical use in an independent manner and has an independent feature as an invention. Particularly, in a parts feeding environment in which shaft-like parts which mix in shaft-like parts of normal length are excessively short, abnormal length shaft-like parts alone, this structural requirement is useful.

From the standpoint, according to another embodiment of the invention, a shaft-like parts feeding apparatus includes a parts feeder for delivering shaft-like parts, and a feed path extending from the parts feeder to a point short of a feed rod, the feed rod performing a feed operation to insert a shaft-like part, held by a holding head, into a receiving hole in an electrode, the shaft-like parts feeding apparatus being characterized in that the spacing between the receiving hole and the holding head with the feed rod having stopped at a predetermined position after advancing, is set to an excessively short parts expelling spacing which prevents excessively short parts shorter than normal length from reaching the receiving hole.

A shaft-like part held by the holding head is a part of normal length or an excessively short part. In the case where a shaft-like part of normal length has been held by the holding head, the travel of the holding head allows the front end of the shaft-like part to be inserted into the receiving hole in the electrode, so that this shaft-like part is correctly held in the receiving hole. However, in the case where an excessively short part has been held by the holding head, the excessively short parts expelling spacing prevents the excessively short part from reaching the receiving hole, so that insertion into the receiving hole becomes impossible. If it is arranged that it fall off the holding head, the expelling of excessively short parts can be effected immediately in front of the receiving hole.

An arrangement is desirable in which the holding head is provided with an air opening for spouting compressed air to deliver the shaft-like part toward the receiving hole.

With the arrangement thus made, since a shaft-like part of normal length is inserted into the receiving hole, it is reliably inserted to a predetermined position in the receiving hole by spouting, in that state, compressed air from the air opening. Since compressed air is spouted in this manner with the shaft-like part inserted into the receiving hole, even if the hydrodynamic pressure of the compressed air biasedly acts on the shaft-like part, the latter can continue being smoothly inserted into the receiving hole irrespective of such bias load of hydrodynamic pressure with the inserted portion serving as a guide.

On the other hand, an excessively short part does not reach the receiving hole and hence it is not inserted therein. Therefore, when compressed air is spouted in this state from the air opening, the hydrodynamic pressure of the compressed air biasedly acts on the shaft-like part. Consequently, the shaft-like part assumes an inclined state, so that it is impossible for the shaft-like part to be delivered from the holding head to advance into the receiving hole. That is, the bias load causes the shaft-like part to be tilted to fall off the holding head. In this manner, combination of the setting of the excessively short parts expelling spacing and the spouting of compressed air from the air opening effects the reliable expelling of excessively short parts.

The excessively short parts expelling spacing is desirably a spacing such that when the holding head travels toward the receiving hole, a shaft-like part of normal length can be inserted at its front end into the receiving hole, but that an excessively short part cannot reach at its front end the receiving hole.

As described above, since the excessively short parts expelling spacing is set on the basis of the relative relation between the receiving hole and the holding head traveling toward the receiving hole, the shaft-like part of normal length is smoothly inserted into the receiving hole in the manner described above, while excessively short parts are expelled without reaching the receiving hole.

Advance of the feed rod is desirably arranged such that the feed rod stops at a position where the axis of the shaft-like part held by the holding head coincides with the axis of the receiving hole and that the shaft-like part of normal length is inserted from this stop position into the receiving hole.

As described above, after the axes of the shaft-like part, held by the holding head, and the receiving hole have coincided, the shaft-like part is inserted into the receiving hole in the presence of the excessively short parts expelling spacing. Therefore, normal parts are fed to the receiving hole in the usual normal operation and predetermined welding is performed.

The electrode having the receiving hole desirably includes a detecting means for detecting a part-like part being inserted into the receiving hole.

The shaft-like part being inserted into the receiving hole can be confirmed by the detecting means. In the case where the advance operation of the electrode is effected by a signal emitted in response to this confirmation, the electrode operation is effected after confirmation of the presence of a shaft-like part, so that the so-called unloaded hammering with a shaft-like part absent can be prevented.

The detecting means is desirably arranged such that an electrifying path is completed by interposition of a shaft-like part in the electrifying path.

Since the electrifying path is completed by the presence of a shaft-like part in this manner, when a shaft-like part is in the receiving hole, the advance operation of the electrode can be reliably started, preventing the electrode from operating in the absence of a shaft-like part. Further, when a shaft-like part held in the electrode is pressed against a mating part such as a steel sheet part, the electrifying path can be completed by further travel of the shaft-like part. That is, something like a switch operation is effected between a portion of the shaft-like part and a portion of the electrode. In such case, when a shaft-like part is not present in the receiving hole, abnormal electrification can be avoided by preventing passage of welding current.

The detecting means is desirably a sensor for detecting the presence of a shaft-like part inserted into the receiving hole.

Since a sensor which directly detects the presence of a shaft-like part is employed, the presence or absence of a shaft-like part can be reliably detected. Further, an arrangement can be so made such that depending on the sensor attaching position, the detection of shaft-like parts is effected, but the detection of excessively short parts is not effected. With the arrangement thus made, even if an excessively short part is inserted into the receiving hole for one reason or another, no signal is issued from the sensor, so that abnormal advance of the electrode can be prevented.

The shaft-like part is a projection bolt comprising a shank formed with a male thread, a flange integral with the shank, and a welding projection formed on the flange.

For example, in a car body assembling step for automobiles, many kinds of projection bolts are welded to a steel sheet part; therefore, an operator may pick up projection bolts lying on the floor and erroneously put them back to the parts feeder, resulting in a mixture of excessively long and excessively short bolts. However, the arrangements and functions as described above repel bolts of abnormal length, thereby preventing welding of erroneous bolts, eliminating problems which otherwise affect the subsequent steps. That is, this arrangement is useful in a parts feeding environment with excessively short bolts alone mixing in normal bolts.

The shaft-like parts feeding apparatus described at first rests on the premise that the apparatus includes a parts feeder for delivering shaft-like parts, and a feed path extending from the parts feeder to a point short of a feed rod, and that the feed rod performs a feed operation to insert a shaft-like part into a receiving hole in an electrode. However, as described above, it sometimes occurs that a shaft-like part fails to be inserted into the receiving hole, and instead it returns to its original position as it is held by the holding head. If such returning operation takes place, the shaft-like part held by the holding head will interfere with a shaft-like part standing by to cause the two shaft-like parts to be intertwined to damage peripheral structures. A measure for solution of such problems is itself worthy of being put to practical use in an independent manner and has an independent feature as an invention.

From the standpoint described above, according to another embodiment of the invention, a shaft-like parts feeding apparatus is of the type in which the feed rod performs a feed operation to insert a shaft-like part, held by the holding head of a feed rod, into a receiving hole in an electrode, the shaft-like parts feeding apparatus being characterized in that the holding head is provided with a recess for holding a shaft-like part, the bottom of the recess being formed with a support surface for the shaft-like part to sit on, the support surface being provided with an air opening for spouting air for delivery of the shaft-like part, the spouting of air from the air opening being set such that it ends during the return operation of the feed rod.

However, in the case of occurrence of a phenomenon such as one in which a shaft-like part precedingly inserted into the receiving hole in the electrode remains in the receiving hole without being welded to a mating member due to failure of passage of welding current, another in which the receiving hole is clogged with foreign matter such as spatter, or another in which the shaft-like part abuts against the end surface of the electrode due to disturbance of the relative position between the shaft-like part and the receiving hole, sometimes it becomes impossible for the shaft-like part to advance into the receiving hole, and with the bolt held by the holding head, the feed rod returns to its original position.

Now, in the invention, since the spouting of air from the air opening is set such that it ends during the return operation of the feed rod, the shaft-like part which is returning as it is held by the holding head is blown off during the return operation by air spouting, so that the holding head becomes empty by the time it reaches a predetermined return position. Therefore, there is no possibility that the shaft-like part held by the holding head will interfere with a shaft-like part standing by to cause the two shaft-like parts to be intertwined, which, in turn, causes clogging of parts or causes the shaft-like part having taken an abnormal direction to damage peripheral structures.

The spouting of air from the air opening is desirably set such that it starts after the front end of the shaft-like part held by the holding head has advanced into the receiving hole.

Since air spouting is started after the front end of the shaft-like part has advanced into the receiving hole in this manner, even if the front end of the shaft-like part swings from side to side it will smoothly advance into the innermost part as guided by the inner surface of the receiving hole. In a free state in which the front end of the shaft-like part does not advance into the receiving hole, if the hydrodynamic pressure of the spouted air acting on the shaft-like part acts with any bias, the front end of the shaft-like part will deviate from the axis, making it impossible to advance into the receiving hole. Such biased hydrodynamic action occurs with a notably high probability. Since air spouting is started after the front end of the shaft-like part has advanced into the receiving hole, the above problem of the impossibility of advance is solved. In other words, in a period when there is no spouting of air, and at a stage where the front end of the shaft-like part has caused no positional deviation, it is reliably advanced into the receiving hole; thus, a smooth operation such as one described above can be secured.

The travel locus of the holding head is desirably set such that advance of the feed rod stops at a position where the axes of the shaft-like part and the receiving hole coincide, and subsequent to this stoppage the holding head travels in the axial direction of the receiving hole.

Since the travel locus described above is imparted to the holding head, the shaft-like part is reliably inserted into the receiving hole. Particularly, it is inserted with coincidence between the axes of the shaft-like part and receiving hole, thereby extremely facilitating insertion displacement in a state of coincidence of axes, and remarkably improving the operating reliability. That is, the inserting operation becomes a simplest one on a single imaginary axis, allowing a unit such as an air cylinder capable of providing highly accurate displacement to be employed as a driving means; this is effective from the standpoint of the operating reliability of the apparatus.

The shaft-like part is a projection bolt comprising a shank formed with a male thread, a flange integral with the shank, and a welding projection formed on the flange.

Since the welding projection or the flange surface can be sat on the support surface, the holding stability of the projection bolt is improved. Further, since the air spouted from the air opening acts on the welding projection or on the flange surface, the hydrodynamic pressure of the spouted air acts on a wide area to provide a reliable press-out force for projection bolt delivery.

The shaft-like parts feeding apparatus described at first rests on the premise that the apparatus includes a parts feeder for delivering shaft-like parts, and a feed path extending from the parts feeder to a point short of a feed rod, and that the feed rod performs a feed operation to insert a shaft-like part into a receiving hole in an electrode. On such premise, the structure of the holding head must be made such that the holding of the bolt and the delivery of the bolt are reliably performed. A measure which meets such requirement is itself worthy of being put to practical use in an independent manner and has an independent feature as an invention.

From the standpoint described above, according to another embodiment of the invention, a shaft-like parts feeding apparatus is of the type in which the feed rod performs a feed operation to insert a shaft-like part, held by the holding head of a feed rod, into a receiving hole in an electrode, the shaft-like parts feeding apparatus being characterized in that the holding head is provided with a recess for holding a shaft-like part, the bottom of the recess being formed with a circular support surface on which shaft-like part sits, the support surface having centrally provided therein an air opening for spouting air for delivery of the shaft-like part, a minute air gap being formed between the maximum outer diameter portion of the shaft-like part sitting on the support surface and the inner peripheral surface of the recess.

When the feed rod travels to a predetermined position, compressed air for delivery is spouted from the air opening against the shaft-like part sitting on the support surface. The hydrodynamic pressure of the spouted air causes the shaft-like part to be delivered from the recess to advance into the receiving hole and held on the electrode side.

Since the air gap between the maximum outer diameter portion of the shaft-like part and the inner peripheral surface of the recess is minute, a high channel resistance is imparted in this air gap portion to the air flow from the air opening. Therefore, the air pressure between the air opening and the air gap is set high, sufficiently securing the pressure for delivering the shaft-like part, causing the shaft-like part to be reliably delivered from the recess. Further, because of such narrow air gap, when the shaft-like part is moving out of the recess, the maximum outer diameter portion of the shaft-like part is guided by the inner peripheral surface of the recess, providing smooth delivery.

Since the air opening opens to the middle of the circular support surface, the air flow from the air opening is received by the middle of the shaft-like part, thereby causing the hydrodynamic pressure to hardly deviate. Therefore, the tilt of the shaft-like part can be minimized, facilitating insertion into the receiving hole. Further, sitting the maximum outer diameter portion on the support surface ensures stabilized holding of the shaft-like part.

The channel area between the maximum outer diameter portion of the shaft-like part and the inner peripheral surface of the recess is desirably set smaller than the channel area of the air opening.

Because of such size relation of the channel areas, the air pressure present in a path from the air opening to a region between the maximum outer diameter portion and the inner peripheral surface of the recess can be made sufficient to deliver the shaft-like part.

In the vicinity of the support surface of the holding head, an apertured, annular permanent magnet is desirably disposed concentric with the support surface.

Therefore, the attractive force of the permanent magnet uniformly acts in an annular region on the shaft-like part, so that the sitting of the shaft-like part on the support surface can be secured under high stability. Further, since the permanent magnet is disposed concentrically with the support surface and is provided with an aperture, the aperture and the air opening can be concentrically disposed in opposed relation to each other, being effective for structural simplification.

The recess is desirably a tapered hole such that the side into which a shaft-like part advances is large in diameter.

When the shaft-like part is delivered from the recess by compressed air, at the early stage the traveling speed of the shaft-like part is slow, but once it starts traveling the speed rapidly increases. If it advances into the receiving hole in the electrode at a high speed in this manner, wear in the edge and inner surface of the receiving hole would abnormally progress. However, since the recess is in the form of a tapered hole, as described above, the air gap between the maximum outer diameter portion of the shaft-like part and the inner peripheral surface of the tapered hole becomes wider as the shaft-like part travels, and hence the channel area of the air gap portion gradually increases. Therefore, the amount of air escaping from the air gap portion increases, gradually decreasing the pressure in a region extending from the air opening to the air gap portion, so that the press-out thrust on the shaft-like part is kept low, suppressing a rise in the traveling speed of the shaft-like part. Therefore, suitably selecting a taper angle for the tapered hole makes it possible to set the speed of advance into the receiving hole at a value effective for minimization of the abnormal wear or the like, enabling prolongation of the durability of the electrode. Further, since the side into which shaft-like parts advances is larger in diameter, reception of the shaft-like part in the recess is smoothly effected.

The diameter of the aperture in the permanent magnet is desirably set equal to or larger than the diameter of the air opening.

Making the diameters of the aperture and air opening equal to each other in this manner allows the aperture to form a portion of the air opening; this is effective for structural simplification. Further, making the diameter of the aperture larger than that of the air opening also allows the air opening to secure a predetermined channel area; thus, the same effect as above is obtained.

The ratio of the diameter of the air opening to the diameter of the support surface is desirably 0.23-0.68.

The diameters of the support surface and air opening have a close connection to the setting of the press-out pressure on the shaft-like part. In the case where the ratio is less than 0.23, i.e., where the diameter of the air opening is too small as compared with the diameter of the support surface, sufficient flow rate cannot be secured, requiring prolonged time for a rise in the press-out pressure on the shaft-like part; this is not preferable from the standpoint of feed efficiency. Further, in the case where the ratio exceeds 0.68, i.e., where the diameter of the air opening is too large as compared with the diameter of the support surface, the press-out pressure on the shaft-like part rapidly rises, and the shaft-like part tends to tilt depending on the bias load of hydrodynamic pressure at the time; this is not preferable from the standpoint of feed accuracy.

The taper angle of the tapered hole is desirably 14-17 degrees.

The taper angle, as described above, has a close connection to the setting of the speed at which the shaft-like part advances into the receiving hole. In the case where the taper angle is less than 14 degrees, the channel area of the air gap portion which increases with the travel of the shaft-like part cannot be given a large value, so that a rise in the traveling speed of the shaft-like part cannot be fully suppressed. Therefore, it follows that the traveling speed of the shaft-like part is too high; this is not desirable. Further, in the case where the taper angle exceeds 17 degrees, the channel area of the air gap portion which increases with the travel of the shaft-like part suddenly increases, so that the traveling speed of the shaft-like part cannot be properly maintained. Therefore, it follows that the traveling speed of the shaft-like part is too slow; this is not desirable.

The opening in the air opening is desirably made in the form of an annular support edge on which the welding projection sits.

Since the welding projection is sitting on the support edge in an annular state, support stability for the welding projection is improved.

The shaft-like part is a projection bolt comprising a shank formed with a male thread, a flange integral with the shank, and a welding projection formed on the flange.

Since the welding projection or the flange surface can be sat on the support surface, the holding stability of the projection bolt is improved. Further, since the air spouted from the air opening acts on the welding projection or on the flange surface, the hydrodynamic pressure of the spouted air acts on a wide area to provide a reliable press-out force for projection bolt delivery.

These and other features of the invention will become more apparent from the following description given with reference to the accompanying drawings.

BRIEF DESCRIPTION OF THE DRAWINGS

FIG. 6 is a schematic side view showing step by step a feed operation for normal bolts;

FIG. 7 is a schematic side view showing step by step a feed operation for excessively short bolts;

FIG. 8 is a sectional view of a movable electrode in another embodiment; and

FIG. 9 is a detailed structural view and a control circuit diagram of a holding head.

DESCRIPTION OF THE PREFERRED EMBODIMENTS

Preferred embodiments of the shaft-like parts feeding apparatus of the invention will now be described.

Embodiments are arranged such that removal of excessively long part longer than normal length and removal of excessively short parts shorter than normal length are systematically effected. The embodiments of all such systems include an invention directed to an excessively long part detecting means as the principal object, an invention directed to an excessively short parts expelling spacing as the principal object, and an invention directed to the structure of the holding head of a holding rod as the principal object.

First, a first embodiment will be described.

Figures 1A, 1B:
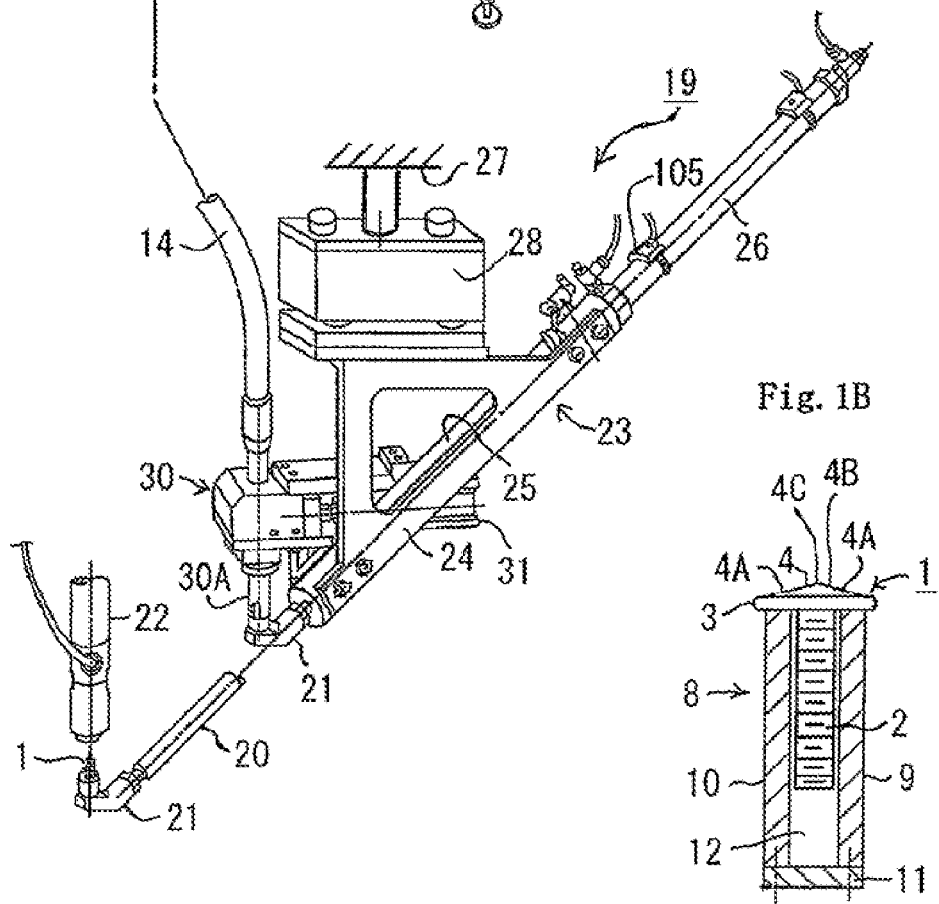
FIG. 1 is an overall perspective view and a front view of a projection bolt.

A shaft-like part in this first embodiment is a projection bolt made of iron, as shown in FIG. 1 (B). The projection bolt 1 comprises a shank 2 formed with a male thread, a circular flange 3 integral with the shank 2, and a welding projection 4 formed on the flange 3. The projection bolt will sometimes be referred to simply as a bolt.

The flange 3 is the maximum outer diameter portion of the bolt 1.

And, the welding projection 4 is formed by a tapered section 4B consisting of a gentle slope surface 4A, the tapered section 4B being concentric with the flange 3 and having a sharp-pointed apex C formed in the middle.

FIG. 1 (A) is a perspective view of the apparatus in its entirety.

First, the structure of a parts feeder and peripherals will be described.

A parts feeder 6 is fixed on a stand 5 which is a stationary member. As this parts feeder 6, various types are employed, including one in which parts are delivered from a delivery path in a vibration type bowl, another in which magnets attached to a rotative plate attract a predetermined number of parts and deliver them from a delivery path, and another in which a rotative disk transfers parts to a transfer path and delivers them from a delivery path. This embodiment employs a type in which parts are delivered from a delivery path in a vibration type bowl.

Projection bolts 1 delivered from a vibration type bowl 7 are transferred along a sloping guide rail 8. This guide rail 8, as shown in FIG. 1 (B), is in the form of two long-sized rail members 9 and 10 which are integrated in a parallel state by a joining member 11. A transfer space 12 is defined between the rail members 9 and 10, and the shank 2 of the bolt 1 passes therethrough. And, the flange 3 slides on the upper surfaces of the rail members 9 and 10; therefore, the bolt 11 is in a so-called hanging state.

The bolt 1 transferred along the guide rail 8 is fed into a delivery unit 13 in general use. The delivery unit 13 delivers bolts 1 one by one to a remote place. Though not illustrated, the internal structure of the delivery unit 13 is such that of the bolts 1 entering the delivery unit 13, only one is caused to travel therein and compressed air is spouted against the bolt 1 thus traveling, thereby delivering it at high speed into a feed hose 14. The reference character 15 denotes a feed pipe for compressed air, connected to the delivery unit 13.

In addition, the reference character 16 denotes an accumulation box, which replenishes bolts 1 to the bowl 7. Also, the reference character 17 denotes a control box storing various control devices to perform operation control of the parts feeder 6, operation control of the delivery unit 13, and operation control of a feed rod 20 to be later described.

Next, a parts feeding device 19 will be described.

The parts feeding device 19 is used to receive a bolt 1 from the delivery unit 1 by the holding head 21 of a feed rod 20 and allow it to reach a movable electrode 22 which is the destination. This movable electrode 22 is adapted to advance and retract substantially vertically. An outer cylinder 25 is fixed to the slopping section 24 of a right-triangle-shaped frame 23. The feed rod 20 is stored for advance and retraction in the outer cylinder 25. An air cylinder 26 is joined to the upper end of the outer cylinder 25, the piston rod (not shown) of the air cylinder 26 being joined to the feed rod 20 to allow the latter to advance and retract.

An air cylinder 28 fixed to a stationary member such as a machine frame is joined to the frame 23, it being arranged that the output of the air cylinder 28 causes the frame 23, outer cylinder 25, feed rod 20, and air cylinder 26 to perform rising and lowering motion as a unit. The attached state of the air cylinder 28 is set such that the direction of this rising and lowering motion is substantially vertical.

If the bolt 1 which comes traveling at high speed in the feed hose 14 is allowed as such to reach the holding head 21, the durability of the holding head may lower due to the shock of the bolt 1. Therefore, a stop pass unit 30 in general use is attached to the frame 23.

This stop pass unit 30, whose internal structure is not illustrated, though, is used to once stop a bolt 1 which comes traveling at high speed and then cause it to travel at low speed to the holding head 21. An advance and retraction member is installed in the stop pass unit 30, the closing of the feed path by the advance and retraction member stopping the high speed bolt 1. And, when the advance and retraction member travels to cancel the closing, the bolt 1 reaches the holding head 21 at low speed. An air cylinder 31 is installed to advance and retract the advance and retraction member. In order to cause the bolt 1 to travel from the stop pass unit 30 to reach the holding head 21, a guide pipe 30A is attached to the lower side of the stop pass unit 30.

FIG. 1 (A) shows a state in which the holding head 21 is positioned immediately below the stop pass unit 30 with the feed rod 20 retracted most, and another state in which the feed rod 20 has advanced. The bolt 1 is transferred to the holding head 21 with the feed rod 20 retracted most, and then the feed rod 20 advances and stops immediately below the movable electrode 22. Then, when the feed rod 20 and the holding head 21 travel upward due to the operation of the air cylinder 28, the bolt 1 is fed to the movable electrode 22.

The manner of feeding the bolt 1 to the movable electrode 22 is shown in FIG. 6 (H). A circular recess 32 is formed in the top of the holding head 21, and the flange 3 of the bolt 1 is sat therein. A circular air opening 33 opens to the middle of the recess 32. This air opening 33 is connected via an air path 34 to an air breathing pump (not shown). The middle of the movable electrode 22 is provided with a receiving hole 35 into which the shank 2 of the bolt 1 is inserted.

When the feed rod 20 advances and the shank 2 becomes coaxial with the receiving hole 35, advance of the feed rod 20 stops. Thereafter, the output of the air cylinder 28 causes the feed rod 20 and the like to go up substantially vertically, whereupon, as shown in two-dot chain lines in FIG. 6 (H) and in FIG. 6 (I), the front end portion of the shank 2 advances into the receiving hole 35. At this point of time, compressed air is spouted from the air opening 33, causing the shank 2 to advance completely into the receiving hole 35. The shank 2, having advanced completely into the receiving hole, is attracted by a permanent magnet 36 (see FIG. 6 (H)) disposed in the innermost part of the receiving hole 35, and the holding of the bolt in the movable electrode 22 is effected. In addition, in order to secure the stability of the bolt 1 in the holding head 21, a permanent magnet 29 is embedded in the lower side of the recess 32.

In addition, FIG. 6 (I) shows on an enlarged scale a normal bolt 1B being held by the holding head 21.

Since compressed air is spouted with the front end of the shank 2 inserted into the receiving hole 35, the shank 2 continues being smoothly inserted into the receiving hole, with the inserted portion serving as a guide portion, even if the shank 2 tends to be tilted by the hydrodynamic pressure of the compressed air acting biasedly on the welding projection 4 and flange 3. Setting the outer diameter of the flange 3 smaller than the inner diameter of the recess 32 makes it easier for the flange 3 to enter the recess 32. However, this causes the compressed air to leak outside the flange 3, producing a bias load of hydrodynamic pressure, with the shank tending to tilt. Under these circumstances, smooth insertion into the receiving hole 35 is effected since the guide portion resulting from insertion into the receiving hole 35 suppresses the tilt of the shank 2.

Next, an excessively long parts detecting means will be described.

There are two types of this excessively long parts detecting means, one which is incorporated into the parts feeder, and the other which is incorporated into a feed path extending from the delivery section 18 of the parts feeder 6 to the terminal end of the feed hose 14, i.e., to a point short of the feed rod 20.

First, the one incorporated into the parts feeder will be described with reference to FIGS. 2 and 3. A transfer step 38 is installed in the inner periphery of the bowl 7, and a suspension transfer section 39 continuous therewith is installed. This transfer section 39 is in the form of two wires 40 and 41, such as piano wires, disposed with a predetermined spacing therebetween. As shown in FIG. 3, the shank 2 of the bolt 1 enters between the two wires 40 and 41, the lower side of the flange 3 being supported by the wires 40 and 41. That is, the bolt 1 is hung by the two wires 40 and 41.

A delivery section 18 is installed to be continuous with the wires 40 and 41. This delivery section 18, which also serves to transfer the bolt 1 in a hanging state, comprises two transfer plates 42 disposed in parallel, with the flange 3 sliding on their upper surfaces 37, 37. Continuous with this delivery section 18 is the guide rail 8.

The transfer step 38, suspension transfer section 39, and delivery section 18 cooperate with each other to form the transfer path of the parts feeder 6.

A pass control member 43 is disposed in the transfer path of the parts feeder 6. This pass control member 43 locks the excessively long portion of the shank 2. The bolts 1 shown in two-dot chain lines in FIG. 2 (B) are, from the right-hand side, an excessively long bolt 1A, a normal bolt 1B, and excessively short bolt 1C, the portion of the excessively long bolt 1A adjacent its lower end being the excessively long portion 2A. The pass control member 43 positioned at a height which allows passage of the normal bolt 1B but which does not allow passage of the excessively long bolt 1A. Here, it is fixed between the two transfer plates 42 as by welding or bolting.

Further, a control plate 44 is disposed above the boundary between the suspension transfer section 39 and the delivery section 18. This control plate 44 has a downwardly opened bridge 45 U-shaped in section joining the two transfer plates together in a bridge manner, with the control plate 44 extending from the front end thereof. The flange 3 of the bolt 1 is adapted to pass under the control plate 44 and bridge 45, with the control plate 44 and bridge 45 preventing the bolt 1 from projecting upward. When the excessively long bolt 1A comes sliding along the suspension transfer section 39, which is a transfer path, under the action of the transfer vibration of the bowl 7, the excessively long portion 2A is caught by the pass control member 43, causing the upper portion of the excessively long bolt 1A to tilt to the right, whereupon the flange 3 (welding projection 4) is locked as it abuts against the lower surface of the control plate 44 and the upper surface 37 of the delivery section 18, making it impossible for the bolt to travel further downstream.

The excessively long bolt 1A becoming locked in this manner causes a cessation of parts transfer to the guide rail 8, allowing the operator to instantly find occurrence of abnormality. And, the operator inserts a tool or the like from the right of the delivery section 18 (see FIG. 2 (B)) to push back the excessively long bolt 1A, now immovable, and then extracts it upward for removal. When the excessively long bolt 1A is removed in this manner, the next normal bolt 1B, passing without contacting the pass control member 43, is transferred to the guide rail 8.

The normal bolt 1B and excessively short bolt 1C passing the pass control member 43 in the manner described above reaches by air transfer the holding head 21 of the feed rod 20 from the delivery unit 13.

Figure 2A:
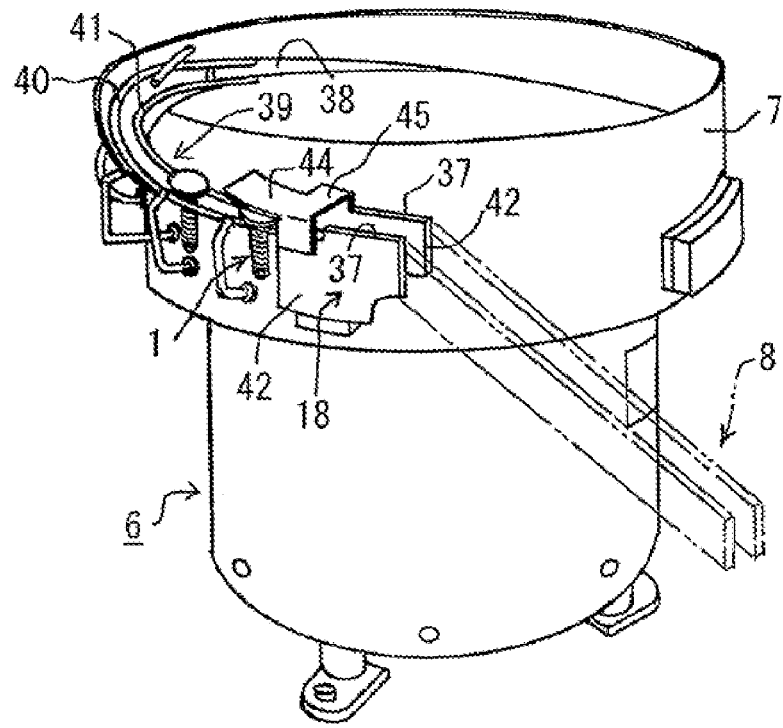
FIG. 2 is a perspective view and a partial longitudinal sectional view of a parts feeder.
Figure 2B:
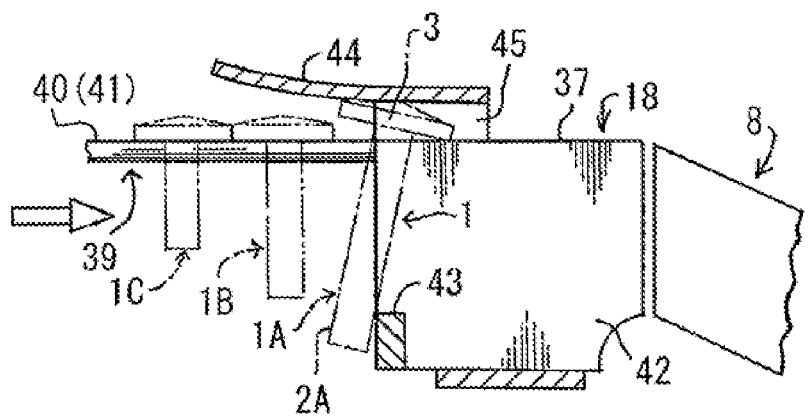
Figure 3A:
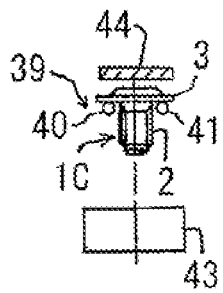
FIG. 3 is a sectional view showing bolts of different lengths in a suspension transfer section.
Figure 3B:
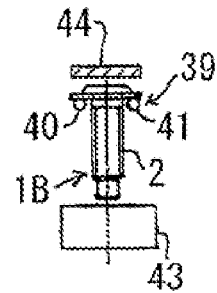
Figure 3C:
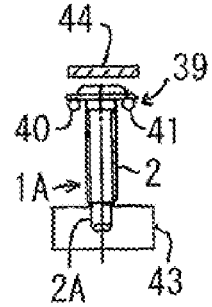

FIG. 3 is a view, seeing FIG. 2 from the left, showing the relation between the respective bolts and the pass control member 43, illustrating a state in which the excessively long portion 2A of the excessively long bolt 1A is caught by the pass control member 43 and the others pass the pass control member 43.

Next, the excessively long parts detecting means incorporated in a feed path extending from the delivery section 18 of the parts feeder 6 to the terminal end of the feed hose 14, i.e., to a point short of the feed rod 20 will be described with reference to FIGS. 4 and 5. In this example, a rectilinear motion feeder 47 is disposed in a feed path extending from the delivery section 18 of the parts feeder 6 to the delivery unit 13 shown in FIG. 1 (A), the rectilinear motion feeder 47 being connected to the delivery unit 13, the rectilinear motion feeder 47 itself constituting a portion of the feed path.

The rectilinear motion feeder 47 in the first embodiment is of the type in general use. That is, rail members 48 and 49 are disposed in parallel to form a hanging type guide rail 50 as shown in FIG. 1 (B). Transfer vibration is imparted to this guide rail 50, whereby the bolt 1 is transferred to the right in FIG. 4. In order to generate such vibration, an excitation unit 51 is installed.

This excitation unit 51 comprises a lower base plate 52 and an upper base plate 53 which are joined together by two sheet springs 54 and 55, with an electromagnetic type vibrator 56 disposed therebetween. The guide rail 50 is joined to the upper base plate 53. The lower base plate 52 is connected to the stationary member 27 through cushion rubbers 57. Further, in order to prevent the bolt 1, hanging state from the guide rail 50, from inching upward, a press-down rail 46 is installed.

A detecting unit 60, which is the excessively long parts detecting means, is disposed in the vicinity of the middle of the rectilinear motion feeder 47. In FIG. 4, this detecting unit 60 is shown in two-dot chain lines.

Figure 4:
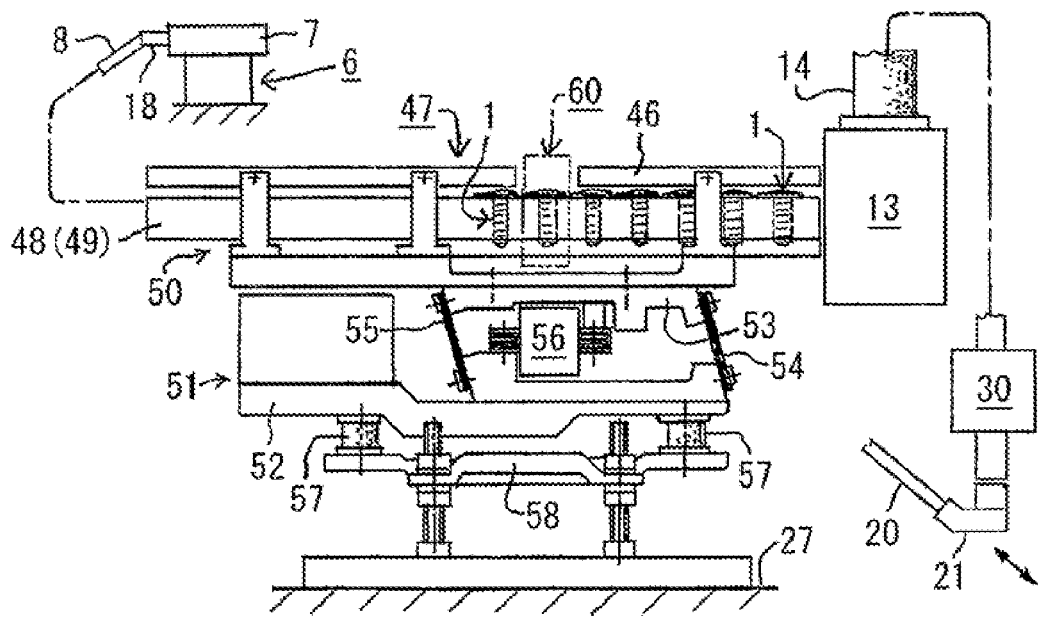
FIG. 4 is a side view of a rectilinear motion feeder.
Figure 5A:
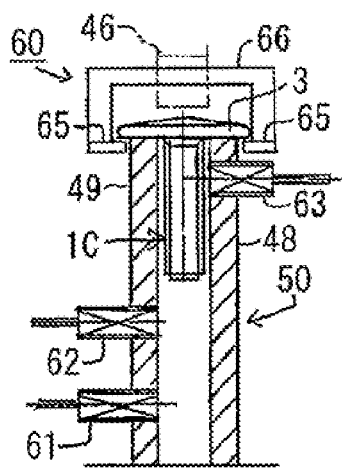
FIG. 5 is a sectional view and a partial perspective view of a detecting unit.
Figure 5B:
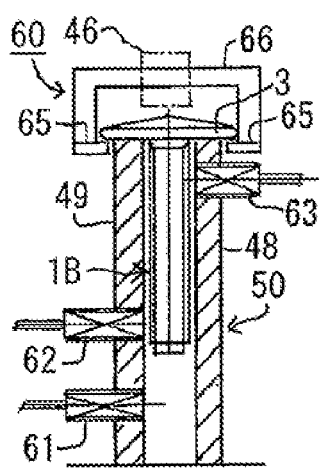
Figure 5C:
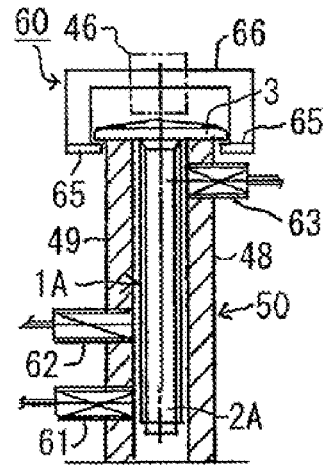
Figure 5D:
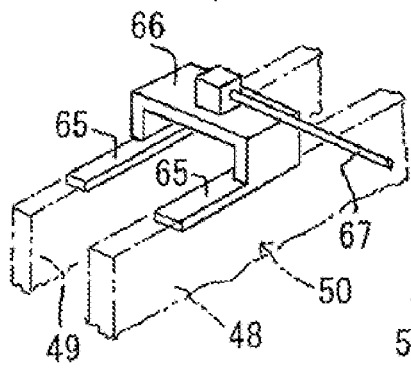
Figure 5E:
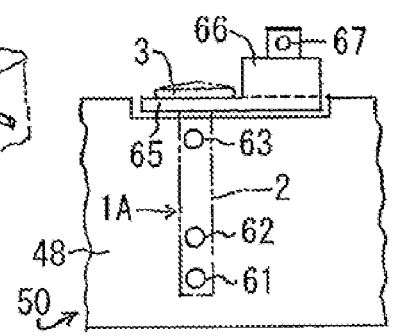
Figure 5F:
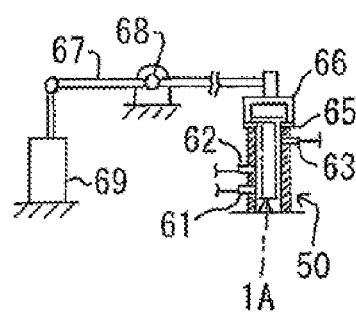

FIGS. 5 (A) through (C) are sectional views of the detecting unit 60 shown in FIG. 4. Attached to the rail member 49 is a sensor means for detecting the excessively long bolt 1A, normal bolt 1B, and excessively short bolt 1C. Various types of this sensor means, including a phototransistor, can be employed, but here an ordinary proximity switch which magnetically detects the shank 2 of the bolt 1 is employed. A first sensor 61 is attached at a position for detecting the excessively long portion 2A of the excessively long bolt 1A. A second sensor 62 is attached at a position for detecting the lower end of the normal bolt 1B.

Further, a presence detecting sensor 63 for detecting all bolts, excessively long, normal, and excessively short, is attached to the upper portion of the rail member 48. This presence detecting sensor 63 has connected thereto a timer (not shown), the arrangement being such that a clock operation is effected by an operating signal from the sensor 63 and a signal is issued after the laps of a predetermined time. In addition, these sensors 61, 62, and 63 are arranged in a vertical straight line along the shank 2, as shown in FIG. 5 (E).

Therefore, when an operating signal is issued from the first sensor 61, this gives notice that the excessively long bolt 1A has come traveling to the detecting unit 60, and it is removed from the guide rail 50 by a removing device to be later described. Further, when an operating signal is issued from the second sensor 62, the normal bolt 1B having come traveling to the detection unit is detected and it travels along the guide rail 50 without operating the removing device. Further, when the excessively short bolt 1C comes traveling, no actuating signal is issued from either of the first and second sensors 61 and 62. And, after the lapse of a predetermined time in response to a signal from the presence detecting sensor 63, the removing device is operated for removal from the guide rail 50.

As to the removing device, various types can be employed, including one in which the abnormal bolt is thrown off by an electromagnetic solenoid, and another in which a lift member lifts an abnormal bolt for removal. Here, the latter type is employed, and FIGS. 5 (D), (E), and (F) are a perspective view and side views, showing the removing device. Two lift pieces 65 are disposed, extending along the tops of the rail members 48 and 49, the two lift pieces 65 being integrated by a bridge member 66. As shown in FIG. 5 (E), the sensors 61, 62, and 63 are disposed immediately below the lift piece 65.

A swing rod 67 is fixed to the top of the bridge member 66 and adapted to swing around the axis of a support shaft 68 fixed to the stationary member. In order to effect this swing operation, an electromagnetic actuator 69 is installed, with the advance-retraction output from the latter swinging the swing rod 67.

When the sensors 16 and 63 sense whether the bolt 1 is excessively long or excessively short as the flange 3 passes along the upper surfaces of the lift pieces 65, the electromagnetic actuator 69 is operated to swing the swing rod 67, thereby performing the removal operation by extracting the abnormal bolt 1A or 1C from the guide rail 50.

The sequential operation of the sensors 61, 62, and 63, timer, and electromagnetic actuator 69 of the removing device can be simply executed by an ordinary sequence control device.

In the above example, the excessively long bolt 1A and excessively short bolt 1C are expelled by the removing device; however, the excessively long bolt 1A alone may be expelled.

In addition, though not illustrated, by disposing the pass control member 43 as shown in FIG. 2 (B) below the guide rail 50 which is the feed path, the same operation as the one shown in FIG. 2 or 3 can be obtained.

Next, the excessively short parts expelling spacing will be described.

While the excessively long bolt 1A is detected and removed by the excessively long parts detecting means disposed in the parts feeder 6 or in the feed path extending from the delivery section 18 of the parts feeder 6 to the end of the feed hose 14, in order to remove the remaining excessively short bolt 1C an excessively short parts expelling spacing L is set between the holding head 21 of the feed rod 20 and the receiving hole 35 in the movable electrode 22.

This excessively short parts expelling spacing L is a spacing such that when the normal bolt 1B is lifted by the operation of the air cylinder 28, as shown in two-dot chain lines in FIG. 6 (H) and in FIG. 6 (I), the front end portion of the normal bolt 1B advances into the receiving hole 35 but that when the excessively short bolt 1C is lifted by the operation of the air cylinder 28, as shown in two-dot chain lines in FIG. 7 (H) and in FIG. 7 (I), the front end portion of the extremely short bolt 1C does not reach the opening in the receiving hole 35.

The first embodiment mentioned above will be described.

The bowl 7 of the parts feeder 6 contains normal bolts 1B but excessively long bolts 1A and excessively short bolts 1C sometimes mix therein. When an excessively long bolt 1A is to be removed in the parts feeder, as shown in FIG. 2 (B), the excessively long bolt 1A caught by the pass control member 43 is removed by the operator as described above. Further, when an excessively long bolt 1A is to be removed in the rectilinear motion feeder 47, the detected excessively long bolt 1A is extracted from the guide rail 50 by the lift pieces 65.

When the excessively long bolt 1A is removed in this manner, the normal bolt 1B and the excessively short bolt 1C reaches the stop pass unit 30 as it travels from the delivery unit 13 via the feed hose 14, and then transferred to the holding head 21.

The behaviors of the normal bolt 1B are shown in FIG. 6. As shown by a circled numeral 1, the normal bolt 1B is held by the holding head 21. Then, the feed rod 20, as shown by a circled numeral 2, advances until the shank 2 is coaxial with the receiving hole 35 (see FIG. 6 (B)). Then, the air cylinder 28 lifts the holding head 21 to cause the front end portion of the shank 2, as shown by a circled numeral 3, to advance into the receiving hole 35 (see FIG. 6(C)). Subsequently, compressed air is spouted from the air opening 33 and as shown by a circled numeral 4, the shank 2 enters the innermost part of the receiving hole 35 and is attracted by the permanent magnet 36 (see FIG. 6(D)). When the feed rod 20 returns, as shown by a circled numeral 7, the movable electrode 22 advances to press the welding projection 4 of the normal bolt 1B against a steel sheet part 72, and a welding current is applied thereto.

In the series of operations described above, since the excessively short part expelling spacing is set in the manner described above, the shank 2 of the normal bolt 1B is reliably inserted into the receiving hole 35 to be held by the movable electrode 22 for normal welding.

The behaviors of the excessively short bolt 1C are shown in FIG. 7. As shown in FIG. 7 (C), the shank 2 is so short that there is a clearance left between it and the opening in the receiving hole 35 even if the head 21 is lifted. If compressed air is spouted from the air opening 33 in this clearance-left state, the excessively short bolt 1C would be tilted to make it impossible for the shank 2 to advance into the receiving hole 35. That is, the hydrodynamic pressure due to the compressed air acts biasedly on the flange 3; thus, it is almost impossible to allow the excessively short bolt 1C to be vertically lifted without being tilted by compressed air. Therefore, the excessively short bolt 1C, as shown in FIG. 7 (D), will fail to enter the receiving hole 35, instead falling off the movable electrode 22. Alternatively, even if enters the receiving hole 35, the attracting magnetic force of the permanent magnet 36 will not sufficiently act on the shank 2; thus, as shown in FIG. 7 (E), when the holding head 21 returns in the direction circled numeral 5, the shank 2 comes out of the receiving hole 35 and likewise falls.

Close observation of such falling phenomenon of the excessively short bolt 1C reveals the following.

FIG. 7 (I) shows on an enlarged scale a state in which the excessively short bolt 1C held by the holding head 21 vibrates little by little under the action of compressed air from the air opening 33. At the stage prior to the spouting of compressed air, as shown in FIG. 6 (I), the flange 3 sits on the bottom surface of the recess 32 under the action of the attractive force of the permanent magnet 29. When compressed air is spouted from the air opening 33 in this state, the resulting hydrodynamic pressure tends to act uniformly on the welding projection 4 and flange 3. However, as described above, since the inner diameter of the recess 32 is larger than the outer diameter of the flange 3, it is virtually impossible to make the flange 3 perfectly coaxial with the recess 32; thus, the hydrodynamic pressure acts biasedly on the welding projection 4 and flange 3. Therefore, as shown in solid lines in FIG. 7 (I), one side of the flange 3 floats against the attractive force of the permanent magnet 29, allowing the compressed air to flow out to tilt the shank 2.

And, since such increase in tilt angle lowers the hydrodynamic pressure of the compressed air, the flange 3 tends to be pulled back to its original position by the attractive force of the permanent magnet 29; however, the inertial force at the time tilts the bolt to the side opposite to what is shown in solid lines, as shown in FIG. 7 (I), causing the compressed air to flow out therefrom. With such phenomenon repeated, the shank 2 moves little by little from side to side in a swing vibration state. While this swing vibration is repeated a number of times, the amplitude is amplified to cause the excessively short bolt 1C to fall off the holding head 21. In addition, during transition from the solid line position to the two-dot chain line position in FIG. 7 (I) described above, the flange 3 in its entirety temporarily float from the bottom surface of the recess 32.

The swing vibration described above is a phenomenon produced by the end of the excessively short bolt 1C being in a free state with the bolt not reaching the receiving hole 35. In this first embodiment, such swing vibration is utilized to remove the excessively short bolt 1C.

As another phenomenon, the tilted excessively short bolt 1C is sometimes removed at once as it is blown off the recess 32 under the action of the hydrodynamic pressure of the compressed air.

In the first embodiment described above, while the air cylinders 26, 28, and 31 are employed, the invention may be embodied by replacing these air cylinders by advance-retraction type electric motors.

Further, in this first embodiment, the movable electrode 22 is of the advance-retraction type, but it is also possible to impart a travel function to the movable electrode 22 so that the movable electrode 22 may travel from the position to which the bolt 1 is fed to a welding position opposed to a mating member such as a steel sheet part.

The functions and effects of the first embodiment described above are enumerated below.

There are cases where in the parts feeder 6, excessively long bolts 1A longer than normal length and excessively short bolts 1C shorter than normal length are mixed with normal bolts 1B. Since the parts feeder 6 or the feed path has disposed therein the excessively long parts detecting means for detecting and removing excessively long parts longer than normal length, excessively long bolts 1A are removed in this excessively long parts detecting means. Therefore, at the time when a projection bolt 1 reaches the holding head 21 of the feed rod 20, excessively long bolts 1A have already been removed.

Next, the bolt 1 held by the holding head 21 is either a normal bolt 1B or an excessively short bolt 1C. In the case where the normal bolt 1B is held by the holding head 21, since the travel of the holding head 21 causes the front end of the shank 2 to be inserted into the receiving hole 35, the shank 2 is correctly held in the receiving hole 35. In the case where the excessively short bolt 1C is held by the holding head 21, however, the excessively short parts expelling space L prevents the excessively short bolt 1C from reaching the receiving hole 35, thereby making insertion into the receiving hole 35 impossible. At this time, if it is arranged that it falls off the holding head 35, the expelling of the excessively short bolt 1C will be effected immediately in front of the receiving hole 35.

As described above, excessively long bolts 1A are expelled in advance in the parts feeder 6 or in the feed path, and an excessively short bolt 1C held by the holding head 21 can be expelled immediately in front of the receiving hole 35 in the movable electrode 22. That is, since the region where excessively long bolts 1A are expelled is located on the upstream side which is flexible in terms of space, and since the region where excessively short bolts 1C are expelled is located on the downstream side, abnormal bolts are systematically removed in a travel path for bolts 1.

Therefore, after an excessively long bolt 1A has been expelled in advance, a treatment is effected in which with a normal or excessively short bolt held by the holding head 21, an excessively short bolt 1C alone cannot reach the receiving hole. In other words, parts are removed by a method such that excessively long bolts 1A are expelled in a region where the expelling is facilitated and excessively short bolts 1C are prevented from reaching the receiving hole 35. Therefore, excessively long and short ones are removed at places suitable for their respective removals, so that normal bolts 1B alone can be reliably fed to the electrode 22, reliably preventing the welding of abnormal bolts, thereby realizing a highly reliable parts treatment for the subsequent steps.

Said excessively long parts detecting means is a pass control member 43 which locks the excessively long portion 2A of an excessively long bolt 1A and which is disposed in the travel path of the parts feeder 6.

Since the pass control member 43 locks the excessively long portion 2A of an excessively long bolt 1A, the excessively long bolt 1A is reliably detected. Since the pass control member 43 disposed in the travel path of the parts feeder 6 receives the excessively long portion 2A of an excessively long bolt 1A coming traveling, the excessively long bolt 1A changes its attitude. Therefore, being an excessively long bolt 1A can be reliably detected on the basis of such change. Usually, it is arranged that projection bolts 1, which are long-sized, be transferred in a vertically suspended state. Consequently, excessively long bolts 1A can be detected simply by disposing at a predetermined height the pass control member 43 adapted to catch an excessively long portion.

The excessively long parts detecting means is a pass control member 43 which locks the excessively long portion 2A of an excessively long bolt 1A and which is disposed in the feed path.

Since the pass control member 43 locks the excessively long portion 2A of an excessively long bolt 1A, excessively long bolts 1A are reliably detected. Since the pass control member 43 disposed in the travel path receives the excessively long portion 2A of an excessively long bolt 1A coming traveling, the excessively long bolt 1A changes its attitude. Therefore, being an excessively long bolt 1A can be reliably detected on the basis of such change. Usually, it is arranged that projection bolts, which are long-sized, be transferred in a vertically suspended state. Consequently, excessively long bolts 1A can be detected simply by disposing at a predetermined height the pass control member 43 adapted to catch an excessively long portion.

The excessively long parts detecting means is a sensor means adapted to be operated by the excessively long portion 2A of an excessively long bolt 1A and which is disposed on the guide rail 50 which is the feed path.

Since a first sensor 61 which is the sensor means detects the excessively long portions 2A of an excessively long bolt 1A to emit an operating signal, excessively long bolts 1A can be reliably detected. Since the first sensor 61 disposed on the guide rail 50 is operated by the excessively long portion 2A of an excessively long bolt 1A coming traveling, being the excessively long bolt 1A can be reliably detected on the basis of the resulting signal. Usually, it is arranged that projection bolts 1, which are long-sized, be transferred in a vertically suspended state. Consequently, excessively long bolts 1A can be detected simply by disposing at a predetermined height the first sensor 61 adapted to be operated by an excessively long portion. Further, with such sensor means disposed in the travel path of the parts feeder 6, it is possible to effect detection of excessively long parts inside the parts feeder 6. In this case, the first sensor 61, in place of the pass control member 43, is attached to transfer plate 42.

It is arranged that advance of the feed rod 20 stop at a position where the axis of a bolt 1 is coaxial with the receiving hole 35 and that from this stop position a normal bolt 1B is inserted into the receiving hole 35.

As described above, after the axes of the normal bolt 1B and receiving hole 35 have coincided, the normal bolt 1B is inserted into the receiving hole 35 in the presence of the excessively short parts expelling spacing L. Therefore, the normal bolt 1 is fed to the receiving hole 35 in the usual correct operation and predetermined welding is performed.

The projection bolt 1 in the excessively long parts detecting means is caused to assume a substantially vertical attitude.

With the bolt 1 thus assuming a substantially vertical attitude, the bolt 1 can be transferred in a vertically suspended state. Such transfer attitude allows the excessively long portion 2A of an excessively long bolt 1A to be positioned in the lower end portion of the excessively long bolt 1A. Disposing, e.g., a pass control member 43 in the lower end portion makes it possible to effect detection of the excessively long bolt 1A. That is, since the bolt 1 has assumed a vertical attitude, detection of the excessively long bolt 1A can be easily effected by causing some member to interfere with the lower end portion.

The shaft-like part is a projection bolt 1 comprising a shank 2 formed with a male thread, a flange 3 integral with the shank 2, and a welding projection 4 formed on the flange 3.

For example, in a car body assembling step for automobiles, many kinds of projection bolts 1 are welded to a steel sheet part 72; therefore, the operator may pick up projection bolts lying on the floor and erroneously put them back to the parts feeder 6, resulting in a mixture of excessively long bolts 1A and excessively short bolts 1C. However, the arrangements and functions as described above repel bolts of abnormal length, thereby preventing welding of erroneous bolts, eliminating problems which otherwise affect the subsequent steps.

Alternatively, in a parts feeding environment in which projection bolts lying on the floor are excessively long bolts 1A alone, the excessively long bolts 1A are removed in the excessively long part detecting means, while the normal bolts 1B alone are transferred to the subsequent steps; thus, welding of erroneous bolts can be prevented.

Next, "an arrangement in which excessively short, abnormal length shaft-like parts are removed at a point immediately in front of the electrode, i.e., between the holding head of the feed rod and the electrode" is put to practical use in a parts feeding environment in which shaft-like parts which mix in shaft-like parts of normal length are excessively short shaft-like parts alone. In this arrangement, there are functions and effects as follows.

The bolt 1 held by the holding head 21 is either a normal bolt 1B or an excessively short bolt 1C. In the case where the normal bolt 1B is held by the holding head 21, since the travel of the holding head 21 causes the front end of the shank 2 to be inserted into the receiving hole 35, the shank 2 is correctly held in the receiving hole 35. In the case where the excessively short bolt 1C is held by the holding head 21, however, the excessively short parts expelling space L prevents the excessively short bolt 1C from reaching the receiving hole 35, thereby making insertion into the receiving hole 35 impossible. At this time, if it is arranged that it fall off the holding head 35, the expelling of the excessively short bolt 1C will be effected immediately in front of the receiving hole 35.

The holding head 21 is provided with an air opening 33 for spouting compressed air to deliver the bolt 1 toward the receiving hole 35.

By the above arrangement, the front end of the shank 2 of the normal bolt 1B is inserted into the receiving hole 35, and in this state, compressed air is spouted from the air opening 33, whereby the normal bolt 1B is reliably inserted to a predetermined position in the receiving hole. Since compressed air is spouted in this manner with the front end of the normal bolt 1B inserted into the receiving hole 35, even if the hydrodynamic pressure of the compressed air biasedly acts on the welding projection or flange of the normal bolt 1B, the latter can continue being smoothly inserted into the receiving hole 35 irrespective of such bias load of hydrodynamic pressure with the inserted portion serving as a guide.

On the other hand, an excessively short bolt 1C does not reach the receiving hole 35 and hence it is not inserted therein. Therefore, when compressed air is spouted in this state from the air opening 33, the hydrodynamic pressure of the compressed air biasedly acts on the welding projection 4 or flange 3. Consequently, the excessively short bolt 1C assumes an inclined state, so that it is impossible for it to be delivered from the holding head 21 to advance into the receiving hole 35. That is, the bias load causes the excessively short bolt 1C to be tilted to fall off the holding head 21. In this manner, combination of the setting of the excessively short parts expelling spacing L and the spouting of compressed air from the air opening 33 effects the reliable expelling of excessively short bolt 1C.

The excessively short parts expelling spacing L is such a spacing that when the holding head 21 travels toward the receiving hole 35, the front end of the normal bolt 1B is inserted into the receiving hole 35 but that the front end of the excessively short bolt 1C cannot reach the receiving hole.

As described above, since the excessively short parts expelling spacing L is set on the basis of the relative relation between the receiving hole 35 and the holding head 21 traveling toward the receiving hole 35, the normal bolt 1B is smoothly inserted into the receiving hole 35 in the manner described above, while the excessively short bolts 1C are expelled without reaching the receiving hole 35.

It is arranged that advance of the feed rod 20 stop at a position where the axis of the bolt 1 held by the holding head 21 coincides with the axis of the receiving hole 35, and that the normal bolt 1B be inserted from this stop position into the receiving hole 35.

As described above, after the axes of the normal bolt 1B and receiving hole 35 have coincided, the normal bolt 1B is inserted into the receiving hole 35 under the presence of the excessively short parts expelling spacing L. Therefore, the normal bolt 1B is fed to the receiving hole 35 in the usual correct operation, and predetermined welding is performed.

Further, in a parts feeding environment in which projection bolts 1 lying on the floor are excessively short bolts 1C alone, the normal bolt 1B alone is inserted into the receiving hole 35 under the presence of the excessively short parts expelling spacing L, and predetermined welding is performed.

Next, a second embodiment will be described with reference to FIG. 8.

In this second embodiment, a function of detecting normal bolts 1B is imparted to the movable electrode 22 in the first embodiment described above.

The movable electrode 22 circular in cross section has an end member 74 integrated with a cylindrical electrode main body 73 by a threaded section 75. This end member 7 is substantially in the form of a cylinder, with an insulation cylinder 78 attached to the inside thereof as by adhesion. Further, a joint section 77 is integrated with the upper end of the electrode main body 73 through a threaded section 76. The electrode main body 73 also has an insulation cylinder 79 fitted therein, with a large diameter hole 80 and a small diameter hole 81 formed therein. The two insulation cylinders 78 and 79 are made of insulating synthetic resin such as polypropylene or polyamide resin.

A heat insulation member 82 slidably fitted in the insulation cylinder 79 is composed of a large diameter section 83 slidable in the large diameter hole 80 and a small diameter section 84 slidable in the small diameter hole 81, with the permanent magnet 36 embedded and, ed therein. The heat insulation member 82 prevents the permanent magnet 36 from being overheated. And, the heat insulation member 82 is made of a conductive material, e.g., stainless steel. The cylindrical inner space of the insulation cylinder 78 and the inner cylindrical space of the small diameter hole 81 constitute the receiving hole 35.

An insulation plate 85 is fitted in the inner end surface of the joint section 77, and a conductor wire 87 on the anode side is connected to a conduction plate 86 closely contacted with the insulation plate 85. A compression coil spring 88 is interposed between the conduction plate 86 and the heat insulation member 82. In addition, the reference character 89 denotes an insulation cylinder protecting the conductor wire 87.

The electrode main body 73, end member 74, heat insulation member 82, and the like are made of a conductive material, e.g., stainless steel or chromium copper.

The bolt 1 inserted into the receiving hole 35 is a normal bolt 1B, and the depth of the receiving hole 35 being set such that when the end of the shank 2 is contacted with the end of the small diameter section 84 under the action of the attractive force of the permanent magnet 36, a small clearance L1 is defined between flange 3 and the front end of the end member 74. Further, a conductor wire 90 on the cathode side is connected to the outer peripheral surface of the electrode main body 73.

The electrifying path is defined by the conductor wire 87, conduction plate 86, compression coil spring 88, heat insulation member 82, normal bolt 1B, end member 74, end member 74, electrode main body 73, and conductor wire 90 in the order mentioned. FIG. 8 (A) shows a state in which the movable electrode 22 advances to press the welding projection 4 of the normal bolt 1B against the steel plate part 72. In this state, a small clearance L1 is defined between the flange 3 and the front end of the end member 74, so that the current-carrying path defined in the order mentioned above is cut by the clearance L1.

When the pressing force on the movable electrode 22 is further increased to advance it, the reaction therefrom causes the heat insulation member 82 to be relatively retracted while compressing the compression coil spring 88, causing the clearance L1 to disappear. That is, the clearance L1 serves the function of a switch. Therefore, the flange 3 and the front end of the end member 74 are pressed against each other, so that an electric current is passed through the electrifying path. With this electric passing state detected, the normal bolt 1B being inserted into the receiving hole 35 can be confirmed, and on the basis of this confirmation signal, a welding current is passed.

When the normal bolt 1 is not inserted into the receiving hole 35 for one reason or another, as shown in FIG. 8 (B), even if the movable electrode 22 advances to press the front end of the end member 74 against the steel plate part 72, passage of electric current from the conductor wire 87 to the conductor wire 90 is not effected; thus, with this no passage of electric current used as a trigger signal, passage of welding current can be stopped beforehand. Thereby, it is possible to avoid an abnormal situation in which the steel plate part 72 alone melts.

Thus, the presence of the normal bolt 1B in the electrifying path ensures that usual pressing or passage of electric current is effected when the normal bolt 1B is inserted; thus, normal welding is performed.

Further, even if a situation occurs in which the excessively short bolt 1C, instead of being expelled, is inserted into the receiving hole 35 for one reason or another, the shank of the excessively short bolt 1C does not reach the small diameter section 84 of the heat insulation member 82, causing the electrifying path to fail to be completed, so that the same operation as when the normal bolt 1B is not inserted into the receiving hole 35 is performed, thereby avoiding an abnormal situation.

The detecting means for detecting the normal bolt 1B being inserted into the receiving hole 35 is realized by completion or incompletion of the electrifying path. On the other hand, there is different arrangement in which as another detecting means, a sensor 91 is installed in the innermost position in the receiving hole 35, as shown in two-dot chain lines in Figs. (A) and (B). Various types can be employed as the sensor 91, but the type employed here is a proximity switch.

Since the sensor 91 is disposed in such position, although the shank 2 of the normal bolt 1B is detected, no detection signal will be obtained from the sensor 91 when the normal bolt 1B is not inserted or when the excessively short bolt 1C is inserted. With such absence of a detection signal used as a trigger signal, the absence of the shank 2 is detected, so that an abnormal passage of welding current can be prevented.

In addition, using absence of a detection signal as a trigger signal may be realized by an ordinary method. For example, an operating signal for the air cylinder 28 adapted to operate upon insertion of the shank 2 into the receiving hole 35 may be used to start the counting of the time of a timer. If there is no signal indicating "presence of the shank 2" after the lapse of a given time, the absence of the shank is confirmed by a signal from this timer and no further operation is performed.

Since the rest of the arrangement is the same as in the preceding embodiment, the same reference characters are added to the parts having the same functions.

The functions and effects of the second embodiment are enumerated as follows.

The movable electrode 22 having the receiving hole 35 has the detecting means for detecting the normal bolt 1B being inserted into the receiving hole 35.

The normal bolt 1B being inserted in the receiving hole 35 can be confirmed by the detecting means. If it is arranged that the signal issued by this confirmation be used to perform the advance operation of the movable electrode 22, the electrode operation is performed after confirmation of the presence of the normal bolt 1B; therefore, making it possible to prevent the so called unloaded hammering with the normal bolt 1B being not inserted or with the excessively short bolt 1C being inserted.

The detecting means has its electrifying path completed by the presence of the normal bolt 1B in the electrifying path.

Since the electrifying path is completed by the presence of the normal bolt 1B as described, the advance operation of the movable electrode 22 can be reliably started when the normal bolt 1B has been inserted into the receiving hole 35, while the operation of the movable electrode 22 with absence of the normal bolt 1B can be reliably prevented. Further, when the normal bolt 1B held by the movable electrode 22 is pressed against the steel plate part 72, the normal bolt 1B further travels to close the clearance L1, thereby completing the electrifying path. That is, something like a switching operation can be performed between the flange 3 of the normal bolt 1B and the end member 74 of the movable electrode 22. In such case, abnormal passage of electric current can be avoided by preventing passage of welding current when the normal bolt 1B is not present in the receiving hole 35.

The detecting means is the sensor 91 for detecting the presence of the normal bolt 1B inserted into the receiving hole 35.

The employment of the sensor 91 for directly detecting the presence of the normal bolt B makes it possible to reliably detect the presence or absence of the normal bolt 1B. Further, attaching the sensor 91 to the innermost position in the receiving hole 35 ensures that detection of the excessively short bolt 1C is not effected while effecting the detection of the normal bolt 1B. By so doing, even if the excessively short bolt 1C is inserted into the receiving hole for one reason or another, no signal is issued from the sensor 91; thus, abnormal advance of the movable electrode 22 can be prevented, and so can the passage of electric current.

The rest of the functions and effects are the same as in the preceding embodiment.

Next, a third embodiment will be described with reference to FIG. 9.

The structure of the holding head 21 and control of the spouting of compressed air will be described in detail with reference to FIG. 9.

Although the welding projection 4 of a projection bolt 1 is not indicated by the reference characters 4A, 4B, 4C in FIG. 9 (A), it is formed by a tapered section 4B consisting of a gentle slope 4A, as described with reference to FIG. 1 (B), the tapered section 4B being concentric with the flange 3 and being centrally formed with a pointed top 4C (see FIG. 9 (C)).

A minute air gap T1 is defined between the flange 3 and the inner peripheral surface of a tapered hole 32A facing the outer peripheral surface of the flange 3.

FIG. 9 (B) is a top view of the holding head 21, showing that the air opening 33, permanent magnet 29, and tapered hole 32A are circular.

As shown in FIG. 9 (C), the opening in the air opening 33 is made in the form of an annular support edge 33A, on which the slope surface 4A of the projection 4 sits. Therefore, the gentle tapered section 4B of the welding projection 4 is supported by the support edge 33A. At this time, the support edge 33A tends to contact the tapered section 4B in a true circle throughout its periphery, so that this contact circle becomes concentric with the welding projection 4. Therefore, it follows that it is held by the holding head 21 such that axes of the tapered section 32A and shank 2 coincide. Further, the presence of the minute air gap T1 reduces the amount by which the flange 3 is eccentric with respect to the tapered hole 32A, so that concentricity of the axes can be secured more reliably.

The dimensions of the bolt 1 are as follows; the length of the shank 2 is 12-25 mm; the diameter of the shank 2 is 4-7 mm; the diameter of the flange 3 is 9-15 mm; and the slope angle of the slope surface 4 with respect to an imaginary plane to which the axis of the shank 2 is perpendicular is 7-12 degrees, the mass of the bolt 1 being 0.0025-0.0055 Kg. In the bolt 1 of FIG. 9 (A), the length of the shank 2 is 23 mm; the diameter of the shank 2 is 6 mm; the diameter of the flange 3 is 13 mm; the slope angle is 9 degrees; and the mass is 0.005 Kg.

The recess 32 is of a cup type having a predetermined depth, and is in the form of a tapered hole 32A shaped such that its side into which the bolt 1 advances, i.e., the opening side has a larger diameter. The bottom of the tapered hole 32A is provided with a support surface 32B on which the welding projection 4 sits. The taper angle θ of the tapered hole 32A is 14-17 degrees, and is 15 degrees here.

The permanent magnet 29 is in the form of an annulus centrally provided with an aperture 29A, the diameter of the aperture 29A being the same as that of the air opening 33. The diameter D1 of the aperture 29A and air opening 33 is 5 mm. The permanent magnet 29 is relatively thin, its thickness being set to 3 mm here, the number of plies being increased to increase the attractive force. It is a two-ply one here, as shown in FIG. 9 (A). The permanent magnet 29 is embedded in the holding head 21, with a closure plate 32C fitted thereon. The hole formed in the middle of this closure plate 32C is the air opening 33. Further, in order to further increase the attractive magnetic force on the bolt 1, the main body portion of the holding head 21 and the closure plate 32C are made of a non-magnetic material such as stainless steel.

The bolt 1 coming into the tapered hole 32A is attracted at its flange 3 onto the support surface 32B by the permanent magnet 29. With such attractive force in action, the tapered section 4B of the welding projection 4 makes true-circle-like contact with the support edge 33A, as described above. Therefore, a state of coaxialness of the tapered hole 32A and shank 2 is reliably obtained; this is extremely favorable for inserting the shank 2 into the receiving hole 35 in the electrode 22.

As described above, the minute air gap T1 is defined between the flange 3, which is the maximum outer diameter portion, and the inner peripheral surface of the tapered hole 32A facing the outer peripheral surface of the flange 3. The width of this air gap T1 is 0.1 mm throughout its periphery. The diameter D2 of the bottom surface of the tapered hole 32A, i.e., the support surface, and the inner diameter of the portion facing the outer peripheral side of the flange 3 are substantially the same, because the taper angle θ is so small that the flange 3 is close to the support surface 32B.

The channel area of the air gap T1 between the flange 3 and the tapered hole 32A is set smaller than the channel area of the air opening 33. Whereas the channel area of the air opening 33 is 19.6 mm², the channel area of the air gap T1 is 4.12 mm². Further, the air pressure from the air opening 33 is 3-5 Kgf, it being 4 Kgf here. The air spouted at such feed air pressure from the air opening 33 is throttled by the air gap T1 of small channel area after the tapered section 4B has left the support edge 33A, so that the air pressure in the path extending from the air opening 33 to the air gap T1 does not greatly decrease; thus, a sufficient press-out pressure can be secured, providing a sufficient thrust acting on the bolt 1. The ratio of the channel area of the air gap T1 to the channel area of the air opening 33 is 0.21 in the example described above. This ratio is set to 0.15-0.28. If it is less than 0.15, this results in the so-called over-throttling, increasing the press-out pressure, making the initial travel speed of the bolt 1 too fast. This is not preferable from the standpoint of wear and the like of the receiving hole 35. Further, if it exceeds 0.28, this results in the so-called excessive leakage, making the press-out pressure scanty, decreasing the travel speed and prolonging the feed time; thus, this is not preferable.

With these taken into consideration, in the case where the diameter of the flange 3 is 9-15 mm, it is appropriate that the inner diameter of the portion of the tapered hole 32A facing the flange 3 be set to 9.2-15.3, securing the channel area of the air gap T1 as one having a throttling effect. In other words, making a value obtained by adding 0.2-0.3 mm to the diameter of the flange 3 be the inner diameter of the tapered hole in the air gap T1 is suitable for securing the press-out pressure on the bolt 1.

The diameter D2 of the support surface 32B and the diameter D1 of the air opening 33 are closely connected with the thrust pressure (thrust force) acting on the bolt 1. In this example, the ratio D1/D2 is 0.38. In the case where this ratio is less that 0.23, that is, where the diameter D1 of the air opening 33 is too small as compared with the diameter D2 of the support surface 32B, the amount of flow from the air opening 33 cannot be sufficiently secured, requiring a long time in increasing the press-out pressure on the bolt 1; this is not preferable from the standpoint of feed efficiency. Further, in the case where the ratio exceeds 0.68, that is, where the diameter D1 of the air opening 33 is too large as compared with the diameter D2 of the support surface 32B, the press-out pressure on the bolt 1 sharply increases, causing the bolt to be tilted by the bias load of hydrodynamic pressure at the time; thus, this is not preferable from the standpoint of feed accuracy.

Since the recess 32 is in the form of the tapered hole 32 A, the air gap between the flange 3 of the bolt 1 and the inner peripheral surface of the tapered hole 32A becomes wider with press-out of the bolt 1, and so does the channel area of the air gap. Consequently, the amount of air leaking from the air gap increases, and the pressure in the path extending from the air opening 33 to the air gap gradually decreases, so that the press-out pressure on the bolt 1 is held down and an increase in the travel speed of the bolt 1 is suppressed. Therefore, by suitably selecting the taper angle θ, the speed at which to advance into the receiving hole 35 can be optimized. Particularly, since the bolt 1 is attracted by the permanent magnet 29, it suddenly leaves the support edge 33A at a point of time the pressure from the air opening 33 has risen to some extent. The bolt 1 is quickly delivered due to such phenomenon of sudden leaving. However, the action of suppressing a rise in the travel speed of the bolt 1 described above controls the delivery speed of the bolt 1 to prevent it from becoming excessive.

In the case where the taper angle θ is less than 14 degrees, the channel area of the air gap increasing with the travel of the bolt 1 cannot be given a large value, and hence a rise in the travel speed of the bolt 1 is not suppressed; this is not preferable. Further, in the case where the taper angle exceeds 17 degrees, the channel area of the air gap increasing with the travel of the bolt 1 suddenly increases, so that the travel speed of the bolt 1 cannot be maintained properly. Therefore, it follows that the travel speed of the bolt 1 is too slow; this is not preferable.

FIGS. 9 (C) through (F) show various states in which the flange 3 sits on the support surface 32B. FIG. 9 (C) shows the state in which the tapered section 4B of the welding projection 4 spreading over the Flange 3 substantially throughout is sitting on the support edge 33A. FIG. 9 (D) shows a state in which the tapered section 4B is centrally provided with a circular ridge 4D supported at its root by the support edge 33A. Since it is thus supported at its root by the support edge 33A, stabilized good support is obtained irrespective of the shape of the ridge 4D. FIG. 9 (E) shows a state in which the air opening 33 is formed with a large diameter port 33B whose opening serves as the support edge 33A, the tapered section 4B being supported by the support edge 33B. And, since the ridge 4D is supported by the large diameter port 33B, stabilized good support is obtained irrespective of the shape of the ridge 4D. FIG. 9 (F) shows the case where the support surface 32B is in the form of a tapered surface capable of close contact with the tapered surface of the tapered section 4B.

As shown in FIG. 9 (C), when the feed rod is retracted most, the opening in the tapered hole 32A coincides with the opening in the guide pipe 30A. The inner diameter D3 of the guide pipe 30A is set smaller than the inner diameter D4 of the opening in the tapered hole 32A, allowing the flange 3 to smoothly advance into the tapered hole 32A.

Next, the timing for spouting air will be described with reference to FIG. 9 (G).

The operation of the present feeding apparatus is performed by a control device 95 composed of a simple computer device or sequence operating device. This control device 95 is stored in the control box 17 shown in FIG. 1 (A). It is arranged that an air switching valve 96 be operated in response to a signal from the control device 95. The air switching valve 96 has connected thereto a pump device 97 for feeding operating air. Air pipes 98 and 99 from the air switching valve 96 are connected to the air cylinder 26, thereby supplying and exhausting operating air. Further, air pipes 100 and 101 from the air switching valve 96 are connected to the air cylinder 28, thereby supplying and exhausting operating air. Further, an air pipe 102 from the air switching valve 96 is connected to the air path 34 (see FIG. 6) of the feed rod 20, thereby spouting air from the air opening 33. In addition, the reference character 103 denotes an expansion/contraction coil for causing the air pipe 102 to follow the advance and retraction of the feed rod 20.

As shown in two-dot chain lines and (I) in FIG. 6 (H) or as shown in FIG. 9 (A), it is arranged that compressed air be spouted from the air opening 33 after the contraction of the air cylinder 28 has lifted the head main body 21 to advance the front end of the shank 2 into the receiving hole 35. An operating signal for this purpose is fed to the control device 95 from a sensor 104 attached to the cylinder 28. The control device 95 receiving this signal sends an operating signal to the air switching valve 96 and compressed air is fed from the air pipe 102 to the air opening 33.

The spouting of air from the air opening 33 is set such that it ends during the return operation of the feed rod 20. The return operation of the feed rod 20 is a combination of the extending operation of the air cylinder 28 and the return stroke of the air cylinder 26 subsequent thereto. In order to continue air spouting to the stage of return stroke, a sensor 105 is attached to the air cylinder 26. The position of attachment of the sensor 105, as shown in FIG. 1 (A) also, is set in the first half of the return stroke. In addition, it may be set in the second half. The spouting of air is started in the state shown in FIG. 9 (A), and thereafter the feed rod shifts to return operation, with air spouting continued halfway to the return stroke. Therefore, even if the bolt 1 is held by the holding head 21 due to the above-described cause when it is returning, the bolt 1 is blown off during the return operation by air spouting, so that the holding head 21 will be empty by the time it reaches a predetermined return position. Therefore, there is no possibility of the bolt 1 interfering with the next bolt standing by.

In addition, in the feed operation, the air gap between the inner peripheral surface of the tapered hole 32A and the flange 3 increases with advance of the shank 2 into the receiving hole 35 and hence the air pressure (press-out thrust) acting on the bolt 1 decreases. However, since the attractive force of the permanent magnet 36 disposed in the innermost part of the receiving hole 35 functions in compensation for the decrease in air pressure, advance of the bolt 1 into the receiving hole 35 is reliably effected.

In the embodiment described above, while the air cylinders 26, 28, and 31 are employed, the invention may be embodied by replacing these air cylinders by advance-retraction type electric motors.

Further, in this embodiment, the movable electrode 22 is of the advance-retraction type, but it is also possible to impart a travel function to the movable electrode 22 so that the movable electrode 22 may travel from the feed position to which the bolt 1 is fed to a welding position opposed to a mating member such as a steel sheet part.

Since the rest of the arrangement is the same as the preceding embodiments, the same reference characters are added to the parts having the same functions.

The functions and effects of the third embodiment described above are enumerated as follows.

The feed rod 20 travels to a position where the shank 2 and the receiving hole 35 are coaxial with each other, and the front end of the shank 2 is inserted into the receiving hole 35, whereupon compressed air is spouted from the air opening 33 against the bolt 1 sitting on the support surface 32B. The hydrodynamic pressure of the spouted air causes the bolt 1 to be delivered from the tapered hole 32A to advance into the innermost part of the receiving hole 35 and held on the electrode side as it is attracted by the permanent magnet 36.

However, in the case of occurrence of a phenomenon such as one in which the bolt 1 precedingly inserted into the receiving hole 35 in the movable electrode 22 remains in the receiving hole 35 without being welded to a steel plate part 72 due to failure of passage of welding current, another in which the receiving hole 35 is clogged with foreign matter such as spatter, or another in which the shank 2 abuts against the end surface of the movable electrode 22 due to disturbance of the relative position between the bolt 1 and the receiving hole 35, sometimes it becomes impossible for the bolt 1 to advance into the receiving hole 35, and with the bolt 1 held in the holding head 21, the feed rod 20 returns to its original position.

Accordingly, in the third embodiment, since the spouting of air form the air opening 33 is set such that it ends during the return operation of the feed rod 20, the bolt 1 which is returning as it is held by the holding head 21 is blown off by air spouting during the return operation, so that the holding head 21 becomes empty by the time it reaches a predetermined return position. Therefore, there is no possibility that the bolt 1 will interfere with the next bolt 1 standing by to be intertwined therewith, which, in turn, causes clogging of parts or causes the bolt 1 having taken an abnormal direction to damage peripheral structures.

The spouting of air from the air opening 33 is set such that it starts after the front end of the bolt 1 held by the holding head 21 has advanced into the receiving hole 35.

Since air spouting is thus started after the front end of the bolt 1 has advanced into the receiving hole 35, even if the bolt 1 swings from side to side it continues smoothly advancing into the innermost part as it is guided by the inner surface of the receiving hole 35. In a free state in which the front end of the bolt 1 does not advance into the receiving hole 35, if the hydrodynamic pressure of the spouted air acting on bolt 1 acts with any bias, the front end of the of the bolt 1 will deviate from the axis, making it impossible to for the bolt 1 to advance into the receiving hole 35. Such biased hydrodynamic action occurs with a notably high probability. Since air spouting is started after the front end of the bolt 1 has advanced into the receiving hole 35, the above problem of the impossibility of advance is solved. In other words, in a period when there is no air spouting, and at a stage where the front end of the bolt 1 has suffered no positional deviation, it is reliably advanced into the receiving hole 35; thus, the smooth operation described above can be secured.

The travel locus of the holding head 21 is set such that advance of the feed rod 20 stops at a position where the axes of the bolt 1 and the receiving hole 35 coincide, and such that subsequent to this stoppage the holding head 21 travels in the axial direction of the receiving hole 35.

Since the travel locus described above is imparted to the holding head 21, bolt 1 is reliably inserted into the receiving hole 35. Particularly, it is inserted with coincidence between the axes of the bolt 1 and receiving hole 35, thereby extremely facilitating insertion displacement in a state of coincidence of axes, and remarkably improving the operating reliability. That is, the inserting operation becomes a simplest one on a single imaginary axis, allowing a unit such as an air cylinder 28 capable of providing highly accurate displacement to be employed as a driving means; this is effective from the standpoint of the operating reliability of the apparatus.

The shaft-like part is a projection bolt 1 comprising a shank 2 formed with a male thread, a flange 3 integral with the shank 2, and a welding projection 4 formed on the flange 3.

Since the welding projection 4 or the flange surface can be sat on the support surface 32B, the holding stability of the projection bolt 1 is improved. Further, since the air spouted from the air opening 33 acts on the welding projection 4 or on the flange surface, the hydrodynamic pressure of the spouted air acts on a wide area to provide a reliable press-out force for delivery of the projection bolt 1.

A shaft-like parts feeding apparatus wherein the feed rod performs a feed operation to insert a shaft-like part held by a holding head into a receiving hole in an electrode, the shaft-like parts feeding apparatus being characterized in that the holding head is provided with a circular recess for holding a shaft-like part, the bottom of the recess being formed with a circular support surface on which the shaft-like part sits, the support surface being centrally provided with an air opening for spouting air for delivery of the shaft-like part, with a minute air gap defined between the maximum outer diameter portion of the shaft-like part sitting on the support surface and the inner peripheral surface of the recess.

The feed rod 20 travels to a position where the shank 2 and the receiving hole 35 are coaxial with each other, and the front end of the shank 2 is inserted into the receiving hole 35, whereupon compressed air is spouted from the air opening 33 against the bolt 1 sitting on the support surface 32B. The hydrodynamic pressure of the spouted air causes the bolt 1 to be delivered from the tapered hole 32A to advance into the innermost part of the receiving hole 35 and held on the electrode side as it is attracted by the permanent magnet 36.

Since the air gap T1 between the flange 3, which is the maximum outer diameter portion, and the inner peripheral surface of the tapered hole 32A is minute, a high channel resistance is imparted in this air gap to the flow of air coming from the air opening 33. Therefore, the air pressure between the air opening 33 and the air gap T1 is set high so that a pressure for delivering the bolt 1 can be sufficiently secured to reliably deliver the bolt 1 from the taper hole 32A. Further, because of such narrow air gap, smooth delivery can be attained as the flange 3 of the bolt 1 is guided by the inner peripheral surface of the tapered hole 32A when the blot 1 goes out of the tapered hole 32A.

Since the air opening 33 opens to the middle of the circular support surface 32B, the air flow from the air opening 33 is supported by the middle of the welding projection 4, thereby making it hard for the hydrodynamic pressure of the air flow to deviate. Therefore, the tilt of the bolt 1 can be minimized, facilitating insertion into the receiving hole 35. Further, sitting the flange 3 on the support surface 32B ensures stabilized holding of the bolt 1.

The channel area between the flange 3 and the inner peripheral surface of the tapered hole 32A is set smaller than the channel area of the air opening 33.

Because of such size relation of the channel areas, the air pressure in the path extending from the air opening 33 to a region between the flange 3 and the inner peripheral surface of the tapered hole 32A can be made sufficient to deliver the bolt 1.

In the vicinity of the support surface 32B of the holding head 21, an annular permanent magnet 29 provided with an aperture 29A is disposed concentrically with the support surface 32B.

Therefore, it follows that the attractive force of the permanent magnet 29 uniformly acts on the flange 3 in the annular region, so that the sitting of the bolt 1 on the support surface 32B can be secured under high stability. Further, since the permanent magnet 29 is disposed concentrically with the support surface 32B and is provided with the aperture 29A, the aperture 29A and the support surface 32B can be concentrically disposed in opposed relation to each other; this is effective for simplification of the structure.

The recess 32 is in the form of the tapered hole 32A shaped such that the side into which the bolt 1 advances is large in diameter.

When the bolt 1 is delivered from the tapered hole 32A by compressed air, at the early stage the traveling speed of the bolt 1 is slow, but once it starts traveling the speed rapidly increases. If it advances into the receiving hole 35 in the fixed electrode 22 at a high speed in this manner, wear in the edge and inner surface of the receiving hole 35 would abnormally progress. However, since the recess 32 is in the form of a tapered hole 32A, as described above, the air gap between the flange 3 of the bolt 1 and the inner peripheral surface of the tapered hole 32A becomes wider as the bolt 1 travels, and hence the channel area of the air gap portion gradually increases. Therefore, the amount of air escaping from the air gap portion increases, gradually decreasing the pressure in a region extending from the air opening 33 to the air gap portion, so that the press-out thrust on the bolt 1 is kept low, suppressing a rise in the traveling speed of the bolt 1. Therefore, suitably selecting the taper angle θ of the tapered hole 32A makes it possible to set the speed of advance into the receiving hole at a value effective for minimization of the abnormal wear or the like, enabling prolongation of the durability of the fixed electrode 22. Further, since the side into which bolt 1 advances is larger in diameter, reception of the bolt 1 in the recess is smoothly effected.

The diameter of the aperture 29A in the permanent magnet 29 is set equal to or larger than the diameter D1 of the air opening 33.

Making equal the diameters of the aperture 29A and air opening 33 in this manner allows the aperture 29A to form a portion of the air opening 33; this is effective for structural simplification. Further, making the diameter of the aperture 29A larger than that of the air opening 33 also allows the air opening 33 to secure a predetermined channel area; thus, the same effect as above is obtained.

The ratio of the diameter D1 of the air opening 33 to the diameter D2 of the support surface 32B is 0.23-0.68.

The diameters D1 and D2 of the support surface 32B and air opening 33, respectively, have a close connection to the setting of the press-out pressure on the bolt 1. In the case where the ratio is less than 0.23, i.e., where the diameter D1 of the air opening 33 is too small as compared with the diameter D2 of the support surface 32B, a sufficient amount of flow from the air opening 33 cannot be secured, requiring prolonged time for a rise in the press-out pressure on the bolt 1; this is not preferable from the standpoint of feed efficiency. Further, in the case where the ratio exceeds 0.68, i.e., where the diameter D1 of the air opening 33 is too large as compared with the diameter D2 of the support surface 32B, the press-out pressure on the bolt 1 rapidly rises, and the bolt 1 tends to tilt depending on the bias load of the hydrodynamic pressure at the time; this is not preferable from the standpoint of feed accuracy.

The taper angle θ of the tapered hole 32A is 14-17 degrees.

The taper angle θ, as described above, has a close connection to the setting of the speed at which the bolt 1 advances into the receiving hole 35. In the case where the taper angle θ is less than 14 degrees, the channel area of the air gap portion which increases with the travel of the bolt 1 cannot be given a large value, so that a rise in the traveling speed of the bolt 1 cannot be fully suppressed. Therefore, it follows that the traveling speed of the shaft-like part is too fast; this is not desirable. Further, in the case where the taper angle θ exceeds 17 degrees, the channel area of the air gap portion which increases with the travel of the bolt 1 suddenly increases, so that the traveling speed of the bolt 1 cannot be properly maintained. Therefore, it follows that the traveling speed of the bolt 1 is too slow; this is not desirable.

The opening in the air opening 33 is made in the form of the annular support edge 33A on which the welding projection 4 sits.

Since the welding projection 4 is sitting on the support edge 33A in an annular state, the support stability of the welding projection is improved. The gentle tapered section 4B of the welding projection 4 is supported by the annular support edge 33A. At this time, since the support edge 33A tends to contact the tapered section 4B in a true circle throughout its periphery, this contact circle becomes concentric with the welding projection 4. Therefore, it follows that it is held by the holding head 21 such that the axes of the tapered section 32A and shank 2 coincide. Further, the presence of the minute air gap T1 reduces the amount by which the flange 3 is eccentric with respect to the tapered hole 32A, so that concentricity of the axes can be secured more accurately.

The shaft-like part is a projection bolt 1 comprising a shank 2 formed with a male thread, a flange 3 integral with the shank 2, and a welding projection 4 formed on the flange 3.

Since the welding projection 4 or the flange surface can be sat on the support surface 32B, the holding stability of the projection bolt 1 is improved. Further, since the air spouted from the air opening 33 acts on the welding projection 4 or on the flange surface, the hydrodynamic pressure of the spouted air acts on a wide area to provide a reliable press-out force for delivery of the projection bolt 1.

The rest of the functions and effects are the same as in the preceding embodiments.

What is claimed is:

1. A parts feeding apparatus for feeding projection bolts into a receiving hole in an electrode, each of the projection bolts having a shank and a flange integral with the shank, said parts feeding apparatus comprising:
    a parts feeder for delivering the projection bolts, said parts feeder including a bowl for holding the projection bolts;
    a feed rod for performing a feed operation to insert the shanks of the projection bolts into the receiving hole of the electrode;
    a holding head connected to said feed rod for holding the projection bolts;
    a feed path extending from said parts feeder to a point short of said feed rod, said feed path including
        (i) a transfer step part formed in an inner periphery of said bowl,
        (ii) a suspension transfer section, and
        (iii) a delivery section having a pair of parallel plates connected to said suspension transfer section;
    an excessively long parts detecting device which detects projection bolts having excessively long shanks, said excessively long parts detecting device including
        (i) a pass control member fixed between said pair of plates of said delivery section for engaging an excessively long shank, and
        (ii) a control plate which prevents the projection bolt having the excessively long shank from projecting upward so as to lock the projection bolt in cooperation with said pass control member,
    wherein said feed rod advances to a predetermined position at which the shanks of the projection bolts are inserted into the receiving hole, and a spacing between said holding head and the receiving hole when said feed rod is in the predetermined position is set to allow projection bolts having a shank which is normal length to enter the receiving hole and prevent projection bolts having an excessively short shank from reaching the receiving hole.

2. The apparatus of claim 1, wherein said holding head has a recess for holding one of the projection bolts, the bottom of said recess being formed with a support surface on which the projection bolt sits, said support surface having an air opening for spouting air for delivery of the projection bolt, the spouting of air from said air opening being set such that it ends during a return operation of said feed rod so as to prevent said feed rod from returning with the projection bolt retained in said holding head.

3. The apparatus of claim 2, wherein the spouting of air from said air opening is started after the shank of one of the projection bolts held by said holding head has advanced into said receiving hole.

4. The apparatus of claim 2, wherein said feed rod is configured such that said holding head is positioned at an intersection of the axes of the projection bolt and the receiving hole when said feed rod is in the predetermined position, and wherein said holding head travels in an axial direction of the receiving hole.

5. The apparatus of claim 1, wherein said feed rod is configured such that said holding head is positioned at an intersection of the axes of the projection bolt and the receiving hole when said feed rod is in the predetermined position.

6. The apparatus of claim 2, wherein the shank of each of the projection bolts is threaded, and a welding projection is formed on the flange of each of the projection bolts.

7. The apparatus of claim 1, wherein said suspension transfer section has two rails which hold the flange of each projection bolt such that the shank is suspended.

8. The apparatus of claim 1, wherein said suspension transfer section has two rails which hold the flange of each projection bolt such that the shank is suspended, and wherein said pass control member is disposed at a predetermined height below said two rails such that each projection bolt with a normal length shank can pass to said delivery section and each projection bolt with an excessively long shank abuts said pass control member and cannot pass to said delivery section.

* * * * *